(12) United States Patent
Hashemi

(10) Patent No.: US 10,835,042 B2
(45) Date of Patent: Nov. 17, 2020

(54) THEATER SEATING

(71) Applicant: IPIC-GOLD CLASS ENTERTAINMENT, LLC, Boca Raton, FL (US)

(72) Inventor: Abdol Hamid Hashemi, Fort Lauderdale, FL (US)

(73) Assignee: IPIC-GOLD CLASS ENTERTAINMENT, LLC, Boca Raton, FL (US)

( * ) Notice: Subject to any disclaimer, the term of this patent is extended or adjusted under 35 U.S.C. 154(b) by 0 days.

(21) Appl. No.: 16/421,988

(22) Filed: May 24, 2019

(65) Prior Publication Data
US 2019/0274430 A1    Sep. 12, 2019

Related U.S. Application Data

(63) Continuation of application No. 14/753,358, filed on Jun. 29, 2015, now abandoned.

(51) Int. Cl.
*A47C 1/12* (2006.01)
*A47B 83/02* (2006.01)
(Continued)

(52) U.S. Cl.
CPC ............... *A47C 1/12* (2013.01); *A47B 83/02* (2013.01); *A47B 83/023* (2017.08); *A47C 7/00* (2013.01); *A47C 7/68* (2013.01); *A47C 7/725* (2013.01); *E04H 3/30* (2013.01); *A47C 1/143* (2013.01); *A47C 3/12* (2013.01); *A47C 3/16* (2013.01); *B64D 11/06* (2013.01); *B64D 11/0606* (2014.12)

(58) Field of Classification Search
CPC .......... A47C 1/12; A47B 83/023; E04H 3/30; B64D 11/06; B64D 11/0606
See application file for complete search history.

(56) References Cited

U.S. PATENT DOCUMENTS

| 1,348,069 A | 7/1920 | Van Fleet |
| 1,660,263 A | 2/1924 | Fowler |
(Continued)

FOREIGN PATENT DOCUMENTS

| EP | 0126056 | 5/1984 |
| EP | 0778380 | 12/1995 |
(Continued)

OTHER PUBLICATIONS

European Patent Office, Extended European Search Report, Patent App. No. EP16176295, dated Nov. 7, 2016. pp. 1-7.
(Continued)

*Primary Examiner* — Syed A Islam
(74) *Attorney, Agent, or Firm* — MacMillan, Sobanski & Todd, LLC

(57) ABSTRACT

Theater seating systems, theater lounge seats, theater seats, and theater seating arrangements are described herein. An example embodiment of a theater seating system comprises a separating panel and a theater seat. The separating panel has a first end, a second end, a first section, a second section, a third section, and a fourth section. The first section, the second section, the third section, and the fourth section cooperatively define a chamber within which the theater seat is disposed. The first end is separated from the second end to define an opening that provides access to the chamber defined by the separating panel.

20 Claims, 12 Drawing Sheets

(51) Int. Cl.

| | | |
|---|---|---|
| *E04H 3/30* | (2006.01) | |
| *A47C 7/68* | (2006.01) | |
| *A47C 7/72* | (2006.01) | |
| *A47C 7/00* | (2006.01) | |
| *A47C 1/14* | (2006.01) | |
| *A47C 3/12* | (2006.01) | |
| *A47C 3/16* | (2006.01) | |
| *B64D 11/06* | (2006.01) | |

(56) References Cited

U.S. PATENT DOCUMENTS

| | | | |
|---|---|---|---|
| 1,523,944 | A | 1/1925 | Fowler |
| 1,701,577 | A | 2/1929 | Lewis |
| 2,041,194 | A | 10/1934 | Lindenberg |
| 2,419,498 | A | 4/1947 | Newton |
| 2,434,857 | A | 1/1948 | Larson |
| 2,557,885 | A | 6/1951 | Murphy et al. |
| 2,947,349 | A | 8/1960 | Kryter |
| 3,079,198 | A | 2/1963 | Morgan et al. |
| 3,545,143 | A | 12/1970 | Bankston |
| 3,668,810 | A | 6/1972 | Bankston |
| 3,685,220 | A | 8/1972 | Morrison |
| 3,762,767 | A | 10/1973 | Powell |
| 4,259,816 | A | 4/1981 | Bergquist |
| 4,715,154 | A | 12/1987 | Baloga |
| 4,826,245 | A | 5/1989 | Entratter |
| 4,936,620 | A | 6/1990 | Francois et al. |
| 5,141,285 | A | 8/1992 | Park |
| 5,845,434 | A | 12/1998 | Hayashi |
| D421,948 | S | 3/2000 | Dryburgh et al. |
| 6,059,364 | A | 5/2000 | Dryburgh et al. |
| 6,164,018 | A | 12/2000 | Runge et al. |
| 6,227,489 | B1 | 5/2001 | Kitamoto et al. |
| 6,582,020 | B1 | 6/2003 | Tenenboym et al. |
| 6,644,736 | B2 | 11/2003 | Nguyen et al. |
| 6,692,069 | B2 | 2/2004 | Beroth et al. |
| D541,064 | S | 4/2007 | Miller et al. |
| 7,419,214 | B2 | 9/2008 | Plant |
| 7,798,446 | B2 | 9/2010 | Park |
| 7,997,531 | B2 | 8/2011 | Bettell |
| 8,419,124 | B2 | 4/2013 | Kramer et al. |
| 8,573,537 | B2 | 11/2013 | Bock |
| 8,888,175 | B2 | 11/2014 | Dobrusin et al. |
| 9,090,332 | B2 | 7/2015 | Asao et al. |
| 2003/0131537 | A1 | 7/2003 | Krikorian et al. |
| 2003/0146654 | A1 | 8/2003 | Nguyen et al. |
| 2003/0216185 | A1 | 11/2003 | Varley |
| 2005/0067870 | A1 | 3/2005 | Rezag et al. |
| 2006/0170261 | A1 | 8/2006 | Baatz et al. |
| 2007/0261981 | A1 | 11/2007 | Ojeda |
| 2009/0152915 | A1 | 6/2009 | Krasna et al. |
| 2009/0241433 | A1 | 10/2009 | Naito et al. |
| 2010/0065683 | A1 | 3/2010 | Darbyshire |
| 2010/0318918 | A1 | 12/2010 | Mahmoodshahi |
| 2012/0318918 | A1 | 12/2012 | Johnson et al. |
| 2013/0242263 | A1 | 9/2013 | Anderson |
| 2014/0225404 | A1 | 8/2014 | Ramirez Magana |
| 2014/0300152 | A1 | 10/2014 | Park et al. |
| 2014/0311046 | A1 | 10/2014 | Ramirez Magana |
| 2014/0318028 | A1 | 10/2014 | Anderson |
| 2016/0016667 | A1 | 1/2016 | Schmidt-Schaeffer |

FOREIGN PATENT DOCUMENTS

| | | |
|---|---|---|
| EP | 1781539 | 3/2009 |
| WO | WO2008122761 | 10/2008 |
| WO | WO2014141102 | 9/2014 |

OTHER PUBLICATIONS

Lavelle, Ciara, "Ipic, Luxury Movie Theater Serving Food and Beverages, to Open in North Miami Beach," Miami New Times, published Jun. 11, 2014, accessed Apr. 14, 2015, http://www.miaminewtimes.com/arts/ipic-luxury-theater-serving-food-and-beverages-to-open-in-north-miami-beach-6508512.

Kim, Susanna, "Luxury Theaters for the Masses," ABC News, published Mar. 1, 2013, accessed Apr. 14, 2015, http://abcnews.go.com/blogs/business/2013/03/luxury-theaters-for-the-masses/.

Glenwood, "Dinner and a Movie NYC Guide: AMC Movie Theater on Broadway and 84th", published Sep. 27, 2013, accessed Apr. 14, 2015, http://www.glenwoodnyc.com/manhattan-living/amc-luxury-movie-theater-nyc/.

Fernquest, Jon, "900 baht luxury movie theatre," Bangkok Post, published Jun. 9, 2014, accessed Apr. 14, 2015, http://www.bangkokpost.com/learning/learning-from-news/414366/900-baht-luxury-movie-theatre.

Richest Lifestyle, "Bangkok's Luxury Movie Theater: Embassy Diplomat Screens," Richestlifestyle.com, accessed Apr. 14, 2015, http://www.richestlifestyle.com/bangkok-luxury-cinema-offers-mini-bar-sofas-butlers/.

bocanewsnow.com Staff, "Boca's New iPic Movie Theater: Simply Awesome," Boca News Now, published Jul. 24, 2012, accessed Apr. 14, 2015, http://bocanewsnow.com/2012/07/24/bocas-new-ipic-movie-theater-simply-awesome/.

Cinepolis, "California Cinepolis Luxury Cinemas Del Mar," accessed Apr. 14, 2015, http://www.cinepolisusa.com/del-mar.aspx.

Embassy Diplomat Screens, "Embassy Diplomat Screens," accessed Apr. 14, 2015, http://www.embassycineplex.com/information.

Intellectual Propery Office of Singapore, "Examination Report," dated Jun. 13, 2019, pp. 1-5.

Intellectual Propery Office of Singapore, "Examination Report," for SG application No. 10201605127U, dated Jun. 13, 2019, pp. 1-5.

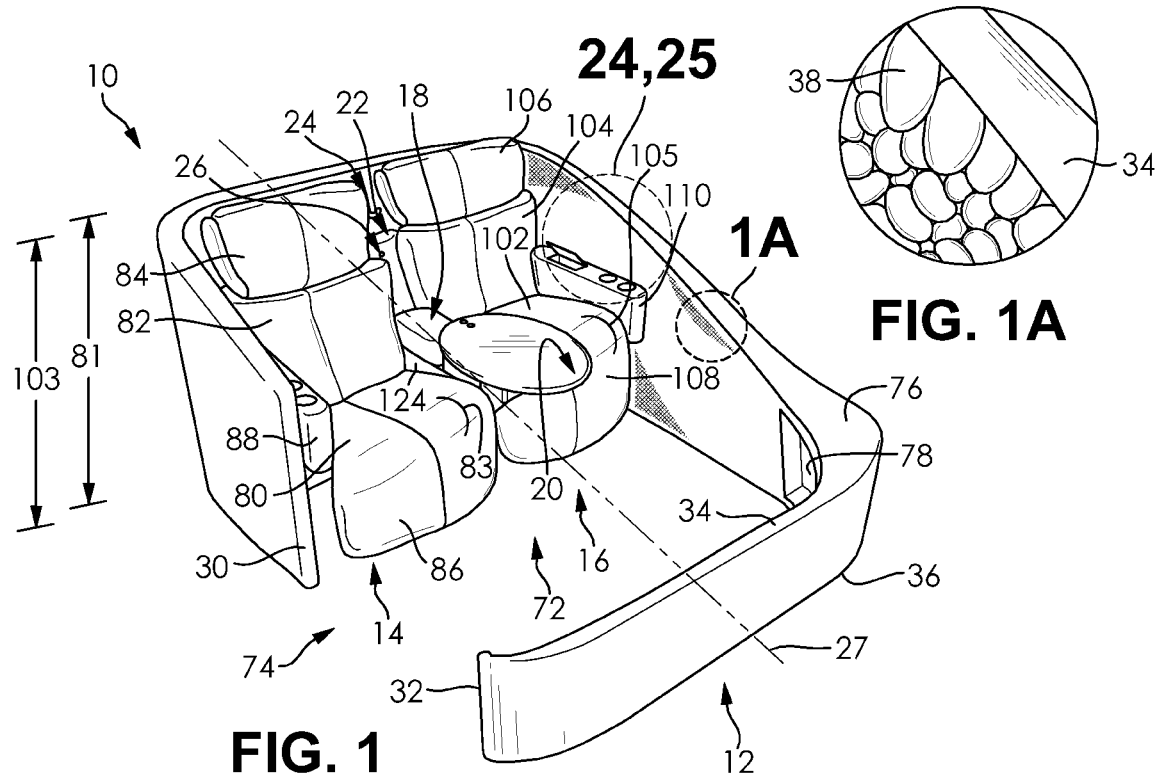
FIG. 1
FIG. 1A
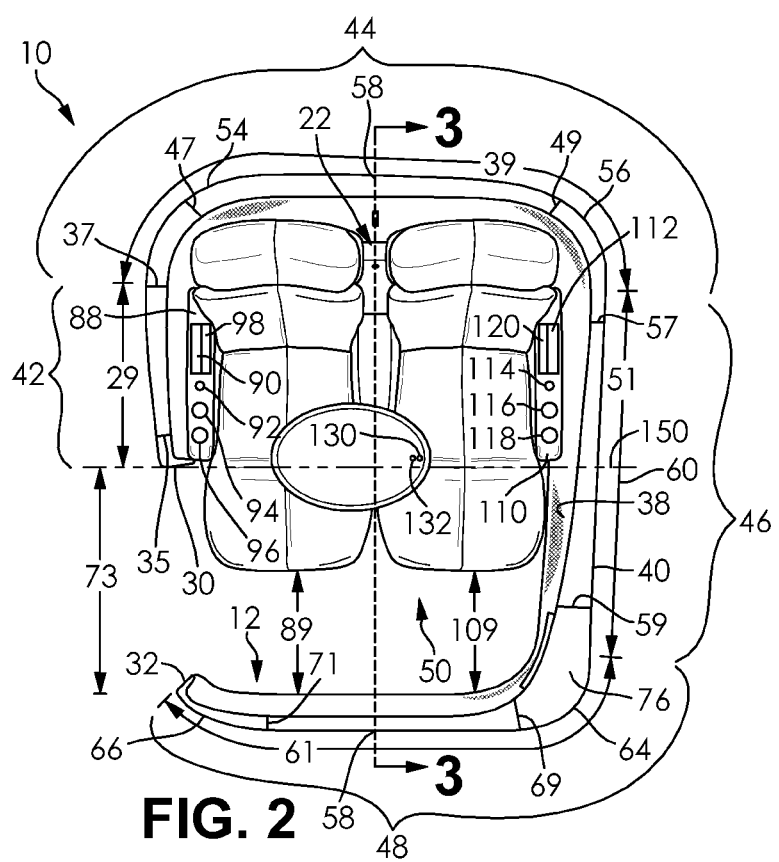
FIG. 2

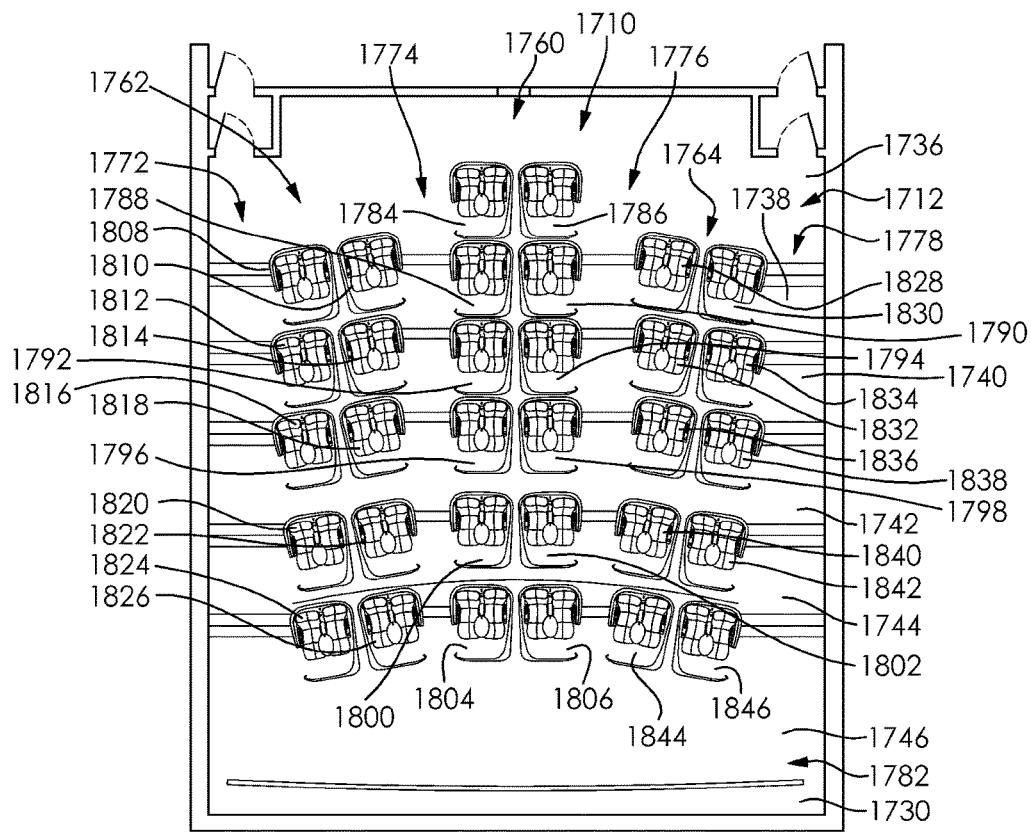
FIG. 23
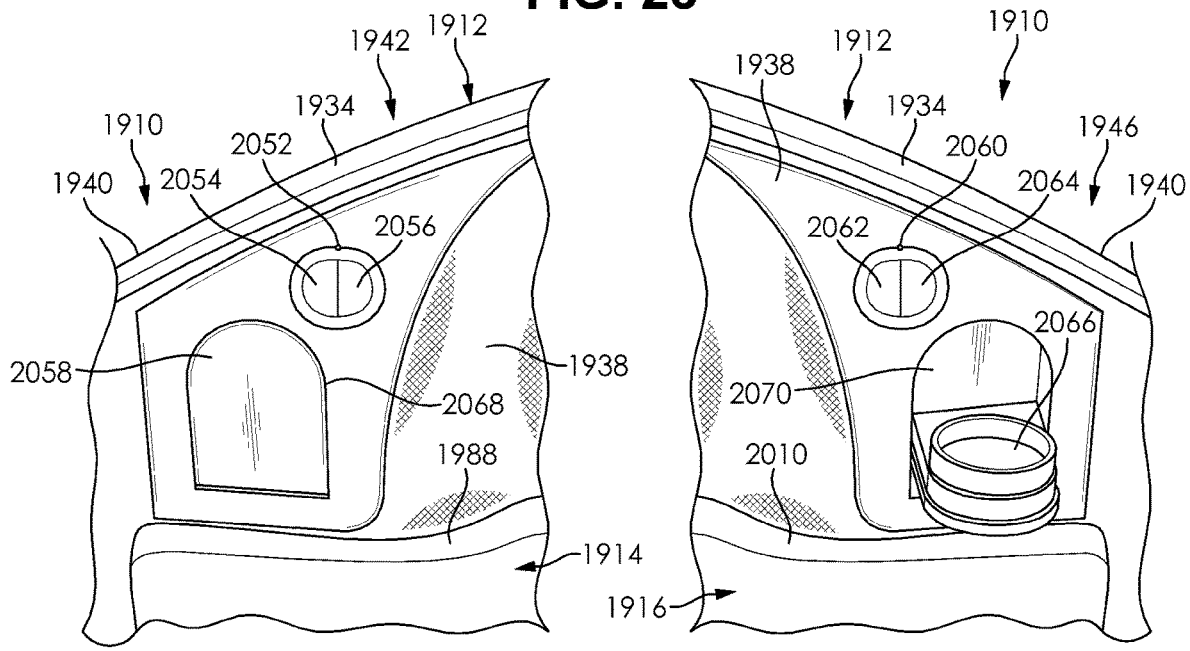
FIG. 24  FIG. 25

THEATER SEATING

RELATED APPLICATION

This application is a continuation of U.S. patent application Ser. No. 14/753,358, filed on Jun. 29, 2015. The entire contents of this related application are hereby incorporated into this disclosure by reference.

FIELD

The disclosure relates generally to the field of theater seating. Specific examples relate to theater seating systems, theater lounge seats, theater seats, and theater seating arrangements.

BACKGROUND

Traditionally, theaters are arranged to include multiple rows of seats that are separated by aisles. For example, in movie theaters, the seats, rows, and aisles are arranged to maximize the number of seats in the theater and limit one audience member to each seat. In addition, the seats disposed within a theater are generally identical and fail to provide any privacy or separation between audience members seated adjacent to one another. By including seats that are identical to one another, current theater arrangements do not provide an audience member with the option of selecting between alternative types of seating, which results in each audience member attending a performance having an identical experience. Furthermore, maximizing the number of seats in a theater can negatively affect an audience member's comfort and also diminish the audience member's line of sight during a performance.

A need exists, therefore, for improvements in theater seating.

BRIEF SUMMARY OF SELECTED EXAMPLE EMBODIMENTS

Theater seating systems are described herein. An example embodiment of a theater seating system comprises a separating panel and a first theater seat. The separating panel has a separating panel lengthwise axis, a first end, a second end, a first section, a second section, a third section, and a fourth section. The separating panel lengthwise axis extends through the second section and the fourth section. The first section extends from the first end to the second section. The second section extends from the first section to the third section. The third section extends from the second section to the fourth section. The fourth section extends from the third section to the second end. The first section, the second section, the third section, and the fourth section cooperatively define a chamber. The first end is separated from the second end to define an opening that provides access to the chamber. The first end is separated from the second end by a first length. The third section has a second length that extends from the second section to the fourth section. The second length is greater than the first length. The first theater seat disposed within the chamber.

Theater lounge seats are described herein. An example embodiment of a double theater lounge seat comprises a base, a cushion, a first table, and a second table. The base comprises a first end, a second end, a first side, a second side, a bottom, and a body that defines a recess, a curved surface, and a storage chamber. The recess is sized and configured to receive a portion of the cushion. The cushion is sized and configured to seat a first audience member and a second audience member. An example embodiment of a single theater lounge seat comprises a base, a cushion, a first table, and a second table. The base comprises a first end, a second end, a first side, a second side, a bottom, and a body that defines a recess, a curved surface, and a storage chamber. The recess is sized and configured to receive a portion of the cushion. The cushion is sized and configured to seat a first audience member.

Theater seats are described herein. An example embodiment of a theater seat comprises a table, a seat pan, a backrest, a headrest, a footrest, a first armrest, and a second armrest. The theater seat is movable between a first, upright, configuration and a second, reclined, configuration.

Theater seating arrangements are described herein. An example embodiment of a theater seating arrangement comprises a theater, a first theater seating system, a second theater seating system, a first aisle, and a second aisle. The theater has a first wall, a second wall, a third wall, a fourth wall, a floor, and a ceiling. The first wall, the second wall, the third wall, the fourth wall, the floor, and the ceiling cooperatively defining an audience area. The first theater seating system is disposed within the audience area and comprises a first separating panel and a first theater seat. The first separating panel has a first separating panel lengthwise axis, a first separating panel first end, a first separating panel second end, a first separating panel first section, a first separating panel second section, a first separating panel third section, and a first separating panel fourth section. The first separating panel lengthwise axis extends through the first separating panel second section and the first separating panel fourth section. The first separating panel first section, the first separating panel second section, the first separating panel third section, and the first separating panel fourth section cooperatively define a first separating panel chamber. The first separating panel first end is separated from the first separating panel second end to define a first separating panel opening that provides access to the first separating panel chamber. The first separating panel first end is separated from the first separating panel second end by a first length. The first separating panel third section has a second length that extends from the first separating panel second section to the first separating panel fourth section. The second length is greater than the first length. The first theater seat is disposed within the first separating panel chamber. The second theater seating system is disposed adjacent to the first theater seating system and within the audience area. The second theater seating system comprises a second separating panel and a second theater seat. The second separating panel has a second separating panel lengthwise axis, a second separating panel first end, a second separating panel second end, a second separating panel first section, a second separating panel second section, a second separating panel third section, and a second separating panel fourth section. The second separating panel lengthwise axis extends through the second separating panel second section and the second separating panel fourth section. The second separating panel first section, the second separating panel second section, the second separating panel third section, and the second separating panel fourth section cooperatively define a second separating panel chamber. The second separating panel first end is separated from the second separating panel second end to define a second separating panel opening that provides access to the second separating panel chamber. The second separating panel first end is separated from the second separating panel second end by a third length. The second separating panel third section has a fourth length that extends from the second separating panel second section to the second separating panel fourth section. The fourth length is greater than the third length. The second theater seat is disposed within the second separating panel chamber. The first aisle is disposed between the first wall of the theater and the first theater seating system. The second aisle is disposed between the second wall of the theater and the second theater seating system. The first separating panel third section and the second separating panel third section are disposed between the first aisle and the second aisle and adjacent to one another.

BRIEF DESCRIPTION OF THE DRAWINGS

FIG. 1 is a perspective view of an example embodiment of a theater seating system. Each of the first seat and the second seat is in a first configuration and the table is in a first position.

FIG. 1A is a magnified view of area 1A illustrated in FIG. 1.

FIG. 2 is a top view of the theater seating system illustrated in FIG. 1. Each of the first seat and the second seat is in a second configuration and the table is in a second position.

FIG. 23 is a plan view of another example embodiment of a theater seating arrangement.

FIG. 24 is a partial view of an alternative embodiment of a theater seating system. The cup holder is shown in a first position.

FIG. 25 is another partial view of the theater seating system illustrated in FIG. 24. The cup holder is shown in a second position.

DETAILED DESCRIPTION

Figure 3:
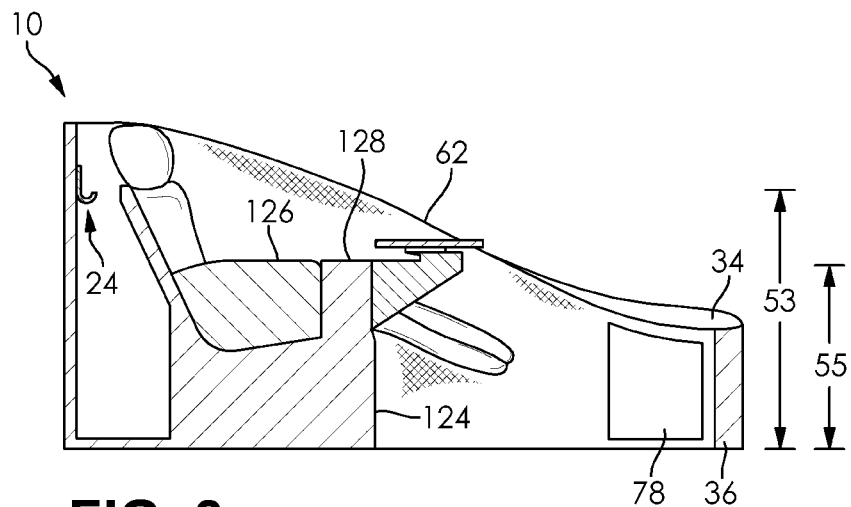
FIG. 3 is a cross-sectional view of the theater seating system illustrated in FIG. 2, taken along line 3-3.

The following detailed description and the appended drawings describe and illustrate various example embodiments of theater seating systems, theater lounge seats, theater seats, and theater seating arrangements. The description and illustration of these examples are provided to enable one skilled in the art to make and use a theater seating system, a theater lounge seat, a theater seat, and a theater seating arrangement. They are not intended to limit the scope of the claims in any manner.

The use of "e.g.," "etc.," "for instance," "example," and "or," and grammatically related terms, indicates non-exclusive alternatives without limitation, unless otherwise noted. The term "theater" refers to a structure within which members of a seated audience experience entertainment. Example structures include, but are not limited to, auditoriums, motion picture theaters, amphitheaters, classrooms, theater houses, dance halls, and any other suitable structure.

FIGS. 1, 2, 3, 4, and 5 illustrate an example embodiment of a theater seating system 10. The theater seating system 10 comprises a separating panel 12, a first theater seat 14, a second theater seat 16, a seat divider 18, a table 20, a wall 22, a hook 24, and a light source 26.

The separating panel 12 has a lengthwise axis 27, a first end 30, a second end 32, a top surface 34, a bottom surface 36, an inner surface 38, an outer surface 40, a first section 42, a second section 44, a third section 46, and a fourth section 48. In the illustrated embodiment, the first section 42, the second section 44, the third section 46, and the fourth section 48 cooperatively define a chamber 50 that is sized and configured to receive the first theater seat 14, the second theater seat 16, the seat divider 18, the table 20, the wall 22, the hook 24, and the light source 26. The outer surface 40 of each of the first section 42, the second section 44, the third section 46, and the fourth section 48 comprise a continuous piece of material.

In the illustrated embodiment, the inner surface 38 is formed of a first material and the outer surface 40 is formed of a second material that is different than the first material. Any suitable material can be used to form an inner surface or an outer surface of a separating panel and selection of a suitable material can be based on various considerations, such as the desired soundproofing intended to be incorporated into a separating panel and/or the desired rigidity intended to be incorporated into a separating panel. Example materials considered suitable to form an outer surface and/or an inner surface include metals, plastics, polymers, fiberglass, leather, suede, acoustic soundproofing material, acoustic soundproofing panels, acoustical walls, foam panels, insulation, mineral wool, acoustic soundproofing drywall, and any other material considered suitable for a particular embodiment. In the illustrated embodiment, the inner surface 38 is formed of an acoustical wall and the outer surface 40 is formed of leather.

Figure 4:
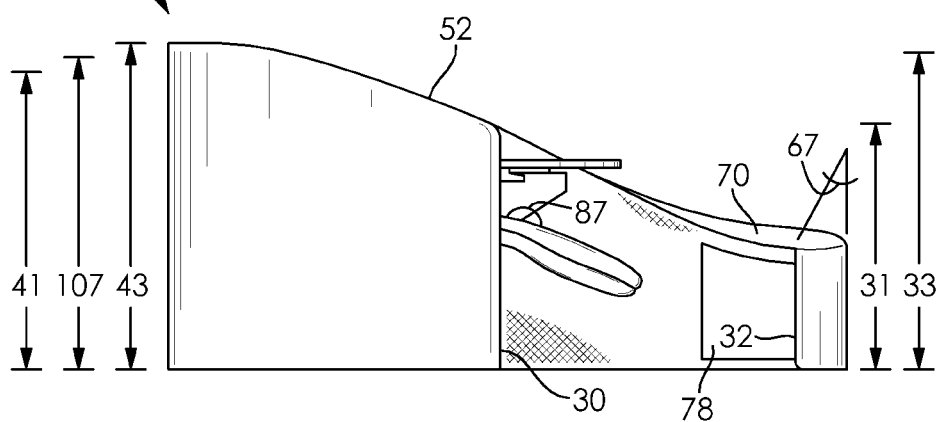
FIG. 4 is an elevation view of the theater seating system illustrated in FIG. 1. Each of the first seat and the second seat is in a second configuration and the table is in a first position.

The first section 42 extends from the first end 30 to the second section 44. The first section 42 has a length 29 that extends from the first end 30 to the second section 44, a first height 31 at the first end 30 that extends from the top surface 34 to the bottom surface 36, and a second height 33 between the first end 30 and the second section 44 that extends from the top surface 34 to the bottom surface 36. In the illustrated embodiment, the first height 31 of the first section 42 is less than the second height 33 of the first section 42 such that the first section 42 increases in height from the first end 30 toward the second section 44. As best illustrated in FIG. 4, this structural arrangement defines a predefined curve 52 along the top surface 34 of the first section 42. The first section 42 has a first thickness 35 at the first end 30 that extends from the inner surface 38 to the outer surface 40 and a second thickness 37 between the first end 30 and the second section 44 that extends from the inner surface 38 to the outer surface 40. In the illustrated embodiment, the first thickness 35 is less than the second thickness 37 such that the thickness of the first section 42 increases from the first end 30 toward the second section 44.

While the first section 42 has been illustrated as having a height that increases from the first end 30 toward the second section 44 and a thickness that increases from the first end 30 toward the second section 44, a first section can have any suitable structural arrangement. Selection of a suitable structural arrangement for a first section can be based on various considerations, including the structural arrangement of a first seat and/or second seat disposed within a chamber defined by a separating panel. Example heights considered suitable for a first section include a first height that is equal to a second height such that the first section has a continuous height along its length, a first height that is greater than a second height such that the first section has a height that decreases along its length, a first height and/or second height that is greater than, about, equal to, or less than 24.5 inches, and any other height considered suitable for a particular embodiment. Example thicknesses considered suitable for a first section include a first thickness that is equal to a second thicknesses such that the first section has a continuous thickness along its length, a first thickness that is greater than a second thickness such that the first section decreases in thickness from the first end toward the second section, a first thickness and/or second thickness that is equal to, greater than, less than, or about, 2.5 inches, and any other thickness considered suitable for a particular embodiment.

The second section 44 extends from the first section 42 to the third section 46. The second section 44 has a first predefined curve 54 and a second predefined curve 56. The first predefined curve 54 extends from the first section 42 and toward a first plane 58 that contains the lengthwise axis 27 of the separating panel 12. The second predefined curve 56 extends from the third section 46 and toward the first plane 58. The structural arrangement of each of the first predefined curve 54 and the second predefined curve 56 defines a rounded corner of the separating panel 12. The second section 44 has a length 39 that extends from the first section 42 to the third section 46, a first height 41 between the first section 42 and the first plane 58, a second height 43 at the first plane 58, and a third height 45 between the first plane 58 and the third section 46. Each of the first height 41, second height 43, and the third height 45 extends from the top surface 34 to the bottom surface 36. In the illustrated embodiment, the second section 44 is disposed from the first end 30 by 38 inches as measured on the lengthwise axis 27, the first height 41 of the second section 44 is less than the second height 43 of the second section 44, and the second height 43 of the second section 44 is greater than the third height 45 of the second section 44. This arrangement provides a second section 44 that increases in height from the first section 42 toward the first plane 58 and increases in height from the third section 46 toward the first plane 58. The second section 44 has a first thickness 47 between the first section 42 and the first plane 58 and a second thickness 49 between the first plane 58 and the third section 46. Each of the first thickness 47 and the second thickness 49 extends from the inner surface 38 to the outer surface 40. In the illustrated embodiment, the first thickness 47 is greater than the second thickness 49 such that the thickness of the second section 44 decreases from a first location between the first section 42 and the first plane 58 to a second location between the first plane 58 and the third section 46.

While the second section 44 has been illustrated as having a particular structural arrangement, a second section can have any suitable structural arrangement and selection of a suitable structural arrangement for a second section can be based on various considerations, including the structural arrangement of a first seat and/or second seat disposed within a chamber defined by a separating panel. Example heights considered suitable for a second section include a first height that is equal to, or greater than, a second height, a third height that is equal to, or greater than, a second height, a first height, second height, and/or third height that is less than, greater to, equal to, or about 42 inches, and any other height considered suitable for a particular embodiment. Example thicknesses considered suitable for a second section include a first thickness that is equal to a second thicknesses such that the second section has a continuous thickness along its length, a first thickness that is less than a second thickness such that the second section increases in thickness from the first section toward the third section, a first thickness and/or second thickness that is equal to, greater than, less than, or about, 2.5 inches, and any other thickness considered suitable for a particular embodiment. Example distances considered suitable to position a second section from a first end, as measured on the lengthwise axis of a separating panel, include distances equal to, less than, greater than, and about 38 inches.

The third section 46 extends from the second section 44 to the fourth section 48. The third section 46 has a length 51 that extends from the second section 44 to the fourth section 48, a first height 53 between the second section 44 and a second plane 150 that is disposed orthogonal to the lengthwise axis 27, and a second height 55 between the second plane 150 and the fourth section 48. Each of the first height 53 and the second height 55 extends from the top surface 34 to the bottom surface 36. The length 51 of the third section 46 is greater than the length 29 of the first section 42 and the distance disposed between the first end 30 and the second end 32 as measured on an axis that is disposed parallel to the lengthwise axis 27. The distance the outer surface 40 of the first section 42 is disposed from the outer surface 40 of the third section 46, as measured on an axis disposed orthogonal to the lengthwise axis 27, is equal to 65 inches. In the illustrated embodiment, the first height 53 of the third section 46 is greater than the second height 55 of the third section 46 such that the third section 46 decreases in height from the second section 44 toward the fourth section 48. As best illustrated in FIG. 3, this structural arrangement defines a predefined curve 62 along the top surface 34 of the third section 46. The third section 46 has a first thickness 57 between the second section 44 and the second plane 150 and a second thickness 59 between the second plane 150 and the fourth section 48. Each of the first thickness 57 and the second thickness 59 extends from the inner surface 38 to the outer surface 40. In the illustrated embodiment, the first thickness 57 is less than the second thickness 59 such that the thickness of the third section 46 increases from a first location between the second section 44 and the second plane 150 to a second location between the second plane 150 and the fourth section 48.

While the third section 46 has been illustrated as having a particular structural arrangement, a third section can have any suitable structural arrangement and selection of a suitable structural arrangement for a third section can be based on various considerations, including the structural arrangement of a first seat and/or second seat disposed within a chamber defined by a separating panel. Example heights considered suitable for a third section include a first height that is equal to, or less than, a second height, a first height and/or second height that is less than, greater than, equal to, or about 42 inches, and any other height considered suitable for a particular embodiment. Example thicknesses considered suitable for a third section include a first thickness that is equal to a second thicknesses such that the third section has a continuous thickness along its length, a first thickness that is greater than a second thickness such that the third section decreases in thickness from the second section toward the fourth section, a first thickness and/or second thickness that is equal to, greater than, less than, or about, 3.5 inches, and any other thickness considered suitable for a particular embodiment. Example distances considered suitable to position a third section relative to a first section, as measured on an axis, or plane, that is disposed orthogonal to the lengthwise axis of a separating panel, include distances equal to, less than, greater than, and about 65 inches.

The fourth section 48 extends from the third section 46 to the second end 32. The fourth section 48 has a first predefined curve 64 and a second predefined curve 66. The first predefined curve 64 extends from the third section 46 and toward the first plane 58. The second predefined curve 66 extends from the second end 32 and toward the first plane 58. The structural arrangement of each of the first predefined curve 64 and the second predefined curve 66 defines a rounded corner of the separating panel 12. The fourth section 48 has a length 61 that extends from the third section 46 to the second end 32, a first height 63 between the third section 46 and the first plane 58, and a second height 65 at the second end 32. The length 61 of the fourth section 48 is less than the length 39 of the second section 44 and each of the first height 63 and the second height 65 extends from the top surface 34 to the bottom surface 36. The distance the outer surface 40 of the second section 44 is disposed from the outer surface 40 of the fourth section 48, as measured along the lengthwise axis 27, is equal to 75.5 inches. In the illustrated embodiment, the first height 63 of the fourth section 48 is greater than the second height 65 of the fourth section 48 such that the fourth section 48 decreases in height from the third section 46 toward the second end 32. In the illustrated embodiment, the second height 65 of the fourth section 48 is equal to 15 inches. As best illustrated in FIG. 4, a portion 70 of the top surface 34 of the fourth section 48 is defined at an angle 67 relative to the outer surface 40 such that the height of the inner surface 38 of the separating panel 12 at portion 70 is less than the height of the outer surface 40 at portion 70. In the illustrated embodiment, the angle is less than 90 degrees. The fourth section 48 has a first thickness 69 between the third section 46 and the first plane 58 and a second thickness 71 between the first plane 58 and the second end 32. Each of the first thickness 69 and the second thickness 71 extends from the inner surface 38 to the outer surface 40. In the illustrated embodiment, the first thickness 69 is greater than the second thickness 71 such that the thickness of the fourth section 48 decreases from a location between the third section 46 and the first plane 58 to a second location between the first plane 58 and the second end 32.

While the fourth section 48 has been illustrated as having a particular structural arrangement, a fourth section can have any suitable structural arrangement and selection of a suitable structural arrangement for a fourth section can be based on various considerations, including the structural arrangement of a first seat and/or second seat disposed within a chamber defined by a separating panel. Example heights considered suitable for a fourth section include a first height that is equal to, or less than, a second height, a first height and/or second height that is less than, greater than, equal to, or about 16.5 inches, and any other height considered suitable for a particular embodiment. Example thicknesses considered suitable for a fourth section include a first thickness that is equal to a second thicknesses such that the fourth section has a continuous thickness along its length, a first thickness that is less than a second thickness such that the fourth section increases in thickness from the third section toward the second end, a first thickness and/or second thickness that is equal to, greater than, less than, or about, 2.0 inches, and any other thickness considered suitable for a particular embodiment. For example, the thickness at portion 70 can be equal to, greater than, or less than, 7.5 inches and/or the length of a fourth section can be equal to, or greater than, the length of a first section. Example distances considered suitable to position a second section relative to a fourth section, as measured along the lengthwise axis of a separating panel, include distances equal to, less than, greater than, and about 75.5 inches. Example heights considered suitable for the second end of a separating panel include heights equal to, less than, greater than, and about 15 inches.

In the illustrated embodiment, each of the first height 41, the second height 43, and third height 45 of the second section 44 are greater than each of the first height 63 and second height 65 of the fourth section 48. The second height 43 of the fourth section 48 is less than one half of the second height 43 of the second section 44. The majority of the length 29 of the first section 42 is disposed on a first section plane, the majority of the length 39 of the second section 44 is disposed on a second section plane, the majority of the length 51 of the third section 46 is disposed on a third section plane, and a majority of the length 61 of the fourth section 48 is disposed on a fourth section plane. The first section plane is disposed at an angle relative to the second section plane that is between 45 degrees and 135 degrees. The second section plane is disposed at an angle relative to the third section plane that is between 45 degrees and 135 degrees. The third section plane is disposed at an angle relative to the fourth section plane that is between 45 degrees and 135 degrees. This structural arrangement provides a separating panel 12 that incorporates privacy for an audience member seated within chamber 50 (e.g., in the first theater seat 14 or the second theater seat 16) and prevents obstructing the line of sight of the audience member during a performance.

In the illustrated embodiment, the first end 30 is separated from the second end 32 by a length 73 that is less than the length 39 of the second section 44, the length 51 of the third section 46, and the length 61 of the fourth section 48. This structural arrangement defines an opening 74 through which audience members and/or staff members can enter and exit the chamber 50. Each of the first theater seat 14 and the opening 74 is positioned on a first side of the first plane 58 and each of the second theater seat 16 and the third section 46 is positioned on a second side of the first plane 58. The opening 74 is positioned such that the first theater seat 14 and the second theater seat 16 are disposed to the left of an audience member and/or staff member entering the chamber 50 through the opening 74.

In the illustrated embodiment, the body 76 of the separating panel 12 defines a storage chamber 78 that extends from an opening on the inner surface 38, toward the outer surface 40, along a portion of the length 51 of the third section 46, and along a portion of the length 61 of the fourth section 48. The storage chamber 78 is sized and configured to house one or more items (e.g., coat, purse). While the storage chamber 78 has been illustrated as being positioned inside the chamber 50 defined by the separating panel 12, on a portion of the length 51 of the third section 46, and on a portion of the length 61 of the fourth section 48, a separating panel body can define any suitable number of storage chambers and can each storage chamber can be positioned at any suitable location on the separating panel. Selection of a suitable number of storage chambers for a separating panel to define and a suitable location to position each storage chamber can be based on various considerations, including the number of audience members intended to be seated within the chamber defined by the separating panel. Example number of storage chambers considered suitable for a separating panel to define include one, at least one, two, a plurality, three, four, and any other number considered suitable for a particular embodiment. Example locations considered suitable to position a storage chamber on a separating panel include on the first section, second section, third section, fourth section, such that the storage chamber extends from an opening defined on the inner surface of a separating panel and toward the outer surface of the separating panel, such that the storage chamber extends from an opening defined on an outer surface of a separating panel and toward the inner surface of the separating panel, such that a storage chamber is defined on both the first section and second section, such that a storage chamber is defined on both the second section and third section, such that a storage chamber is defined on both the third section and fourth section, and any other location considered suitable for a particular embodiment.

While the separating panel 12 has been illustrated as having a particular structural arrangement, a separating panel included in a theater seating system can have any suitable structural arrangement. Selection of a suitable structural arrangement for a separating panel can be based on various considerations, including the desired degree of privacy intended to be provided to an audience member seated within a chamber defined by the separating panel and/or the theater seating arrangement intended to be achieved. Example structural arrangements considered suitable for a separating panel include separating panels that define a chamber having any suitable size, shape, and configuration, such as separating panels that define a chamber that is cylindrical, substantially cylindrical, cuboidal, substantially cuboidal, a trapezoidal prism, a substantially trapezoidal prism, a triangular prism, substantially a triangular prism, spherical, substantially spherical, semi-spherical, substantially semi-spherical, and any other configuration considered suitable for a particular embodiment. In the illustrated embodiment, the separating panel 12 defines a chamber 50 that is a trapezoidal prism with rounded edges along its height. A separating panel can include an inner surface and/or outer surface that is/are disposed at any suitable angle relative to a plane that contains the bottom surface of the separating panel or relative to the surface upon which the separating panel is positioned (e.g., ground). For example, an inner surface and/or an outer surface of a separating panel can be disposed orthogonal to, or an angle between about 45 degrees and about 135 degrees relative to, a plane that contains the bottom surface of the separating panel or the surface upon which the separating panel is positioned.

While the outer surface 40 of each of the first section 42, the second section 44, the third section 46, and the fourth section 48 have been illustrated as comprising a continuous piece of material, the outer surface of a separating panel can be formed of any suitable number of components that can be releasably and/or fixedly attached to one another using any suitable technique or method of attachment. Selection of a suitable number of components to form the outer surface of a separating panel and a suitable technique or method of attachment can be based on various considerations, including the material(s) that forms a separating panel. Example number of components considered suitable to form the outer surface a separating panel include one, at least one, two, a plurality, three, four, five, six, seven, eight, and any other number considered suitable for a particular embodiment. Example technique and methods of attachment considered suitable between one or more components that form the outer surface of a separating panel include using threaded components, snap fit configurations, and any other technique or method considered suitable for a particular embodiment.

While the second section 44 of the separating panel 12 has been illustrated as including a first predefined curve 54 and a second predefined curve 56 and the fourth section 48 of the separating panel 12 has been illustrated as including a first predefined curve 64 and a second predefined curve 66, a separating panel can define any suitable arrangement between a first section and a second section, a second section and a third section, a third section and a fourth section, and at the second end. Selection of a suitable structural arrangement between a first section and a second section, a second section and a third section, a third section and a fourth section, and at the second end can be based on various considerations, such as the desired theater seating arrangement intended to be achieved. Example structural arrangements considered suitable between a first section and a second section, a second section and a third section, a third section and a fourth section, and/or at the second end include curved, rounded, angled surfaces, right angles, multifaceted arrangements, and any other structural arrangement considered suitable for a particular embodiment.

While the separating panel 12 has been illustrated as defining an opening 74 between the first end 30 and the second end 32 that is positioned such that the first theater seat 14 and the second theater seat 16 are disposed to the left of an audience member and/or staff member entering the chamber 50 through the opening 74, a separating panel can define an opening at any suitable location. Selection of a suitable location to position an opening can be based on various considerations, such as the desired theater seating arrangement intended to be achieved. Example locations considered suitable to define an opening include on the first section, on the second section, on the third section, on the fourth section, and any other location considered suitable for a particular embodiment. Alternative embodiments can include separating panels that have a mirrored configuration of the separating panel 12 illustrated and described with respect to FIGS. 1, 2, 3, 4, and 5. In these alternative embodiments, a second seat and the opening defined by a separating panel is positioned on a first side of a plane that contains the lengthwise axis of the separating panel and each of a first seat and the third section of the separating panel is positioned on a second side of the plane that contains the lengthwise axis of the separating panel. For example, the separating panel of these alternative embodiments define an opening between the first end and the second end of the separating panel that is positioned such that a first seat and a second seat are disposed to the right of an audience member and/or staff member entering the chamber defined by the separating panel through the opening.

In the illustrated embodiment, each of the first theater seat 14, the second theater seat 16, the seat divider 18, the table 20, the wall 22, and the hook 24 is disposed within the chamber 50 defined by the separating panel 12 such that a substantially open section 72 of the chamber 50 is disposed between the first theater seat 14 and fourth section 48 of the separating panel 12 and between the second theater seat 16 and the fourth section 48 of the separating panel 12. This structural arrangement provides an area for one or more audience members to enter and exit the chamber 50 defined by the separating panel 50.

Each of the first theater seat 14 and the second theater seat 16 is disposed adjacent the seat divider 18 such that the seat divider 18 is disposed between the first theater seat 14 and the second theater seat 16. The wall 22 is disposed between the second section 44 and each of the first theater seat 14 and the second theater seat 16. The table 20 is pivotably attached to the seat divider 18 and the hook 24 is attached to the wall 22, as described in more detail herein. Alternative embodiments can omit the inclusion of a seat divider, a table, a wall, and/or a hook based on desired structural configuration of a theater seating system.

The first theater seat 14 is disposed adjacent the first section 42, the second section 44, the seat divider 18, and the wall 22. As shown in FIG. 2, the first theater seat 14 is disposed on a first side of the first plane 58, between the first section 42 and the third section 46, and between the second section 44 and the fourth section 48. The first theater seat 14 is movable between a first, upright, configuration, as shown in FIG. 1, and a second, reclined, configuration, as shown in FIG. 2. The first theater seat 14 has a seat pan 80, a backrest 82, a headrest 84, a footrest 86, and an armrest 88. The seat pan 80, the backrest 82, the headrest 84, and the footrest 86 cooperatively define a structure that is sized and configured to receive an audience member when the audience member is in the seated or reclined position. The backrest 82 of the first theater seat 14 is directed toward a plane that contains a portion of the fourth section 48 (e.g., a majority of the length 61 of the fourth section 48). In the first configuration, the first theater seat 14 is in an upright position such that the headrest 84 is disposed a first distance 81 from the bottom surface 36 of the separating panel 12 and the footrest 86 is disposed at a first angle 83 relative to the seat pan 80. In addition, in the first configuration, the first theater seat 14 is separated from the fourth section 48 by a length 89 that is less than the length 51 of the third section 46. The length 89 being measured on an axis that is parallel to the lengthwise axis 27. In the second configuration, the first theater seat 14 is in a reclined position such that the headrest 84 is disposed a second distance 85 from the bottom surface 36 of the separating panel 12 and the footrest 86 is disposed at a second angle 87 relative to the seat pan 80 that is less than the first angle 83. In the illustrated embodiment, the first distance 81 is equal to 42 inches, is greater than the second height 43 of the second section 44, and is greater than the second distance 85.

The armrest 88 is disposed adjacent the first section 42 and between the seat pan 80 and the first section 42 of the separating panel 12. The armrest 88 has a door 90, a seat control button 92, a first cup holder 94, a second cup holder 96, and defines a chamber 98. The door 90 is hingedly attached to the armrest 88, is disposed over the chamber 98, and is movable between a first, closed, configuration (not shown) and a second, open, configuration, as shown in FIG. 2. The seat control button 92 is disposed between the door 90 and the first cup holder 94 and comprises a button that is configured to move the first theater seat 14 from the first, upright, configuration to the second, reclined, configuration when activated. Movement of the first theater seat 14 from the second, reclined, configuration to the first, upright, configuration resets the seat control button 92 such that once it is activated again the first theater seat 14 moves from the first, upright, configuration to the second, reclined, configuration. The first cup holder 94 is disposed between the seat control button 92 and the second cup holder 96. Each of the first cup holder 94 and second cup holder 96 is sized and configured to receive a portion of a cup (e.g., base of cup), or other structure.

The second theater seat 16 is disposed adjacent the third section 46, the second section 44, the seat divider 18, and the wall 22. As shown in FIG. 2, the second seat 16 is disposed on a second side of the first plane 58, between the first section 42 and the third section 46, and between the second section 44 and the fourth section 48. The second theater seat 16 is movable between a first, upright, configuration, as shown in FIG. 1, and a second, reclined, configuration, as shown in FIG. 2. The second theater seat 16 has a seat pan 102, a backrest 104, a headrest 106, a footrest 108, and an armrest 110. The seat pan 102, the backrest 104, the headrest 106, and the footrest 108 cooperatively define a structure that is sized and configured to receive an audience member when the audience member is in the seated or reclined position. The backrest 104 of the second theater seat 16 is directed toward a plane that contains a portion of the fourth section 48 (e.g., a majority of the length 61 of the fourth section 48). In the first configuration, the second theater seat 16 is in an upright position such that the headrest 106 is disposed a first distance 103 from the bottom surface 36 of the separating panel 12 and the footrest 108 is disposed at a first angle 105 relative to the seat pan 102. In addition, in the first configuration, the second theater seat 16 is separated from the fourth section 48 by a length 109 that is less than the length 51 of the third section 46. The length 109 being measured on an axis that is parallel to the lengthwise axis 27. In the second configuration, the second theater seat 16 is in a reclined position such that the headrest 106 is disposed a second distance 107 from the bottom surface 36 of the separating panel 12 and the footrest 108 is disposed at a second angle (not shown) relative to the seat pan 102 that is equal to the second angle 87 of the first theater seat 14. In the illustrated embodiment, the first distance 103 is equal to 42 inches, is greater than the second height 43 of the second section 44, and is greater than the second distance 107.

The armrest 110 is disposed adjacent the third section 46 and between the seat pan 102 and the third section 46 of the separating panel 12. The armrest 110 has a door 112, a seat control button 114, a first cup holder 116, a second cup holder 118, and defines a chamber 120. The door 112 is hingedly attached to the armrest 110, is disposed over the chamber 120, and is movable between a first, closed, configuration (not shown) and a second, open, configuration, as shown in FIG. 2. The seat control button 114 is disposed between the door 112 and the first cup holder 116 and comprises a button that is configured to move the second theater seat 16 from the first, upright, configuration to the second, reclined, configuration when activated. Movement of the second theater seat 16 from the second, reclined, configuration to the first, upright, configuration resets the seat control button 114 such that once it is activated the second theater seat 16 moves from the first, upright, configuration to the second, reclined, configuration. The first cup holder 116 is disposed between the seat control button 114 and the second cup holder 118. Each of the first cup holder 116 and second cup holder 118 is sized and configured to receive a portion of a cup (e.g., base of cup), or other structure.

While the first distance 81 of the first theater seat 14 has been illustrated as greater than the second height 43 of the second section 44 and equal to 42 inches and the first distance 103 of the second theater seat 16 has been illustrated as greater than the second height 43 of the second section 44 and equal to 42 inches, a headrest can be positioned any suitable distance from the bottom surface of a separating panel when the seat is in the first configuration or second configuration. Selection of a suitable distance to position a headrest in the first configuration and/or second configuration relative to the bottom surface of a separating panel can be based on various considerations, including the structural arrangement of a separating panel. For example, a headrest can be positioned from the bottom surface of a separating panel a distance that is equal to, greater than, or less than, the height of a second section of a separating panel when in the first configuration and/or second configuration.

Any suitable means, structure, system, and/or component can be used to move the first theater seat 14 and/or the second set 16 between the first, upright, configuration and the second, reclined, configuration, and selection of a suitable means, structure, system, and/or component can be based on various considerations, including the desired angle intended to be achieved when a seat is moved from the first, upright, configuration to the second, reclined, configuration. Example means, structures, systems, and/or components considered suitable to accomplish movement of a first seat and/or second seat between a first, upright, configuration and a second, reclined, configuration include push button systems, lever activated systems, power activated systems, manually activated systems, and any other means, structure, system, and/or component considered suitable for a particular embodiment.

While the theater seating system 10 has been illustrated as including a first theater seat 14 and a second theater seat 16, a theater seating system can include any suitable number of seats and selection of a suitable number of seats to include in a theater seating system can be based on various considerations, such as the number of audience members intended to be seated within the chamber defined by a separating panel. Example numbers of seats considered suitable to include in a theater seating system include one, at least one, two, a plurality, three, four, five, and any other number considered suitable for a particular embodiment. Alternative embodiments can include only a single theater seat, more than one theater seat, a sofa, a lounge seat, a double theater lounge seat, a single theater lounge seat, a couch, and/or any combination of these structures.

The seat divider 18 is disposed between the first theater seat 14 and the second theater seat 16 and has a base 124, a first portion 126, and a second portion 128. The first portion 126 is hingedly attached to the base 124 and is movable between a first, down, configuration and a second, upright, configuration. In the first configuration, the bottom surface of the first portion 126 contacts the base 124 of the seat divider 18. In the second configuration, the first portion 126 is substantially free of contact with the base 124. The first portion 126 of the seat divider 18 acts as an armrest for an audience member that is seated in first theater seat 14 and/or an audience member that is seated in the second theater seat 16. Alternative embodiments can omit the inclusion of a seat divider such that a first seat is disposed adjacent to a second seat.

While the seat divider 18 has been illustrated as having a particular structural arrangement, a seat divider of a theater seating system can have any suitable structural arrangement. Selection of a suitable structural arrangement for a seat divider can be based on various considerations, including the desired degree of separation defined between a first seat and a second seat. Example structural arrangements considered suitable for a seat divider include cylindrical, substantially cylindrical, cuboidal, substantially cuboidal, a trapezoidal prism, a substantially trapezoidal prism, a triangular prism, a substantially triangular prism, spherical, substantially spherical, semi-spherical, substantially semi-spherical, and any other configuration considered suitable for a particular embodiment. In the illustrated embodiment, the seat divider 18 is cuboidal.

Figure 5:
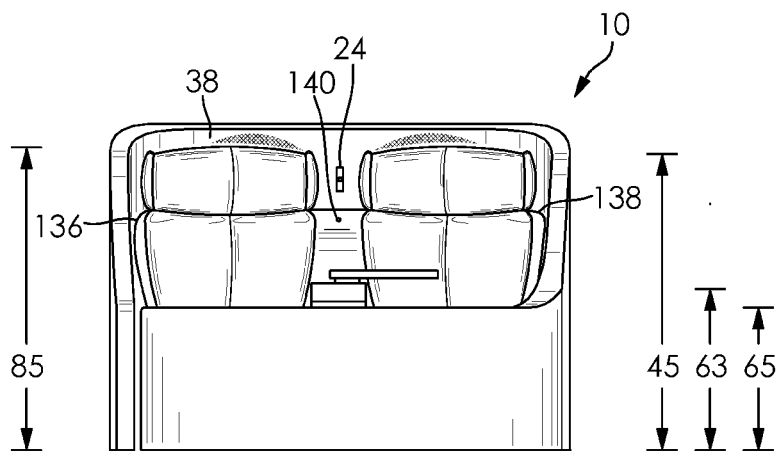
FIG. 5 is another elevation view of the theater seating system illustrated in FIG. 1. Each of the first seat and the second seat is in a second configuration and the table is in a third position.

The table 20 is pivotably attached to the second portion 128 of the seat divider 18 and includes a service call button 130 and a light control button 132. The table 20 is movable between a first position, as shown in FIG. 1, a second position, as shown in FIG. 2, and a third position, as shown in FIG. 5. In the first position, the table 20 is disposed between the first theater seat 14 and the second theater seat 16 such that a majority of the surface area of the table 20 is disposed over the open section 72 defined within the chamber 50. In the second position, a majority of the surface area of the table 20 is disposed over the first theater seat 14. In the third position, a majority of the surface area of the table 20 is disposed over the second theater seat 16. The service call button 130 is operatively connected to a signaling device and is configured to be activated by an audience member seated in the first theater seat 14 or second theater seat 16. The service call button 130, when activated by an audience member, activates the signaling device to indicate to a staff member that the audience member desires attention (e.g., would like to order food or a beverage). The light control button 132 is configured to be activated by an audience member seated in the first theater seat 14 or second theater seat 16. The light control button 132 is operatively connected to the light source 26 and is configured to activate and deactivate the light source 26, as described in more detail herein.

The service call button 130 can comprise any suitable means and/or structure and be operatively connected to any suitable signaling device and selection of a suitable means and/or structure for a service call button and a suitable signaling device can be based on various considerations, including the distance between the service call button and the signaling device. Example means and/or structures considered suitable for a service call button and/or a signaling device include service control buttons that are wired to a signaling device, service control buttons that are wirelessly connected to a signaling device, signaling devices that illustrate a service call on a display, and any other means, structure, and/or signaling device considered suitable for a particular embodiment.

The wall 22 is disposed between the second section 44 of the separating panel 12 and each of the first theater seat 14 and the second theater seat 16. As illustrated in FIG. 5, the wall 22 has a first end 136, a second end 138, and defines an opening 140 that is sized and configured to receive the light source 26. The first end 136 of the wall 22 is disposed between the first theater seat 14 and the second section 44 of the separating panel 12 and the second end 138 of the wall 22 is disposed between the second theater seat 16 and the second section 44 of the separating panel 12.

The hook 24 is attached to the inner surface 38 of the separating panel 12 and extends away from the outer surface 40 of the separating panel 12. The hook 24 is sized and configured to releasably attach one or more elements (e.g., a jacket, coat, purse) to the hook 24. The hook 24 can comprise any suitable structure capable of releasably attaching one or more elements to the hook and selection of a suitable structure for a hook can be based on various considerations, including the configuration of the element intended to be releasably attached to the hook. Example structural arrangements considered suitable for a hook include hooks that define a single projection that extends from a base attached to a wall, hooks that define more than one projection, each projection extending from a base attached to a wall, and any other structural arrangement considered suitable for a particular embodiment.

The light source 26 is disposed within the opening 140 defined by the wall 22 and has a first, off, state and a second, on, state. The light source 26 is operatively connected to a power source (not shown) and to the light control button 132 disposed on the table 20. The light source 26 is movable between the first, off, state and the second, on, state via activation of the light control button 132. The light source 26 is directed toward the table 20 such that when the light source 26 is in the second, on, state, the light source 26 illuminates the table 20 and any structure disposed on the table 20.

Any suitable light source 26 can be included in a theater seating system, and selection of a suitable light source can be based on various considerations, including the desired amount of illumination intended to be directed toward a table or other structure disposed within a chamber defined by a separating panel. Example light sources considered suitable to include in a theater seating system include incandescent light bulbs, compact fluorescent light bulbs, halogen light bulbs, light emitting diodes, and any other light source considered suitable for a particular embodiment.

As illustrated in FIGS. 1, 2, 3, 4, and 5, the separating panel 12 is a structure that partially wraps around the first theater seat 14, second theater seat 16, the seat divider 18, the table 20, the wall 22, the hook 24, and the light source 26, and includes one or more sections that are disposed in front of the first theater seat 14 and the second theater seat 16. For example, in the illustrated embodiment, the footrest 86 of the first theater seat 14 and the footrest 108 of the second theater seat 16 are directed toward the fourth section 48 of the separating panel 12 and an audience member seated in either the first theater seat 14 or the second theater seat 16 would have a line of sight that extends over the fourth section 48 of the separating panel 12. In the illustrated embodiment, the first end 30 and a portion of the third section 46 of the separating panel 12 are disposed on the second plane 150 that is disposed orthogonal to the lengthwise axis 27 of the separating panel 12. In the illustrated embodiment, the footrest 86 of the first theater seat 14 and the footrest 108 of the second theater seat 16 pass through the plane 150 when each of the first theater seat 14 and the second theater seat 16 are in the second, reclined, configuration. However, alternative embodiments can include a separating panel that wraps around the entirety, or a portion, of a first seat, a second seat, and/or any other component disposed within the chamber defined by the separating panel. The inclusion of a separating panel is considered advantageous at least because this structure provides privacy to the one or more audience members seated within the chamber 50 defined by the separating panel 12 during a performance and separates audience members seated within the chamber 50 defined by the separating panel 12 from other audience members attending the performance.

Figure 6:
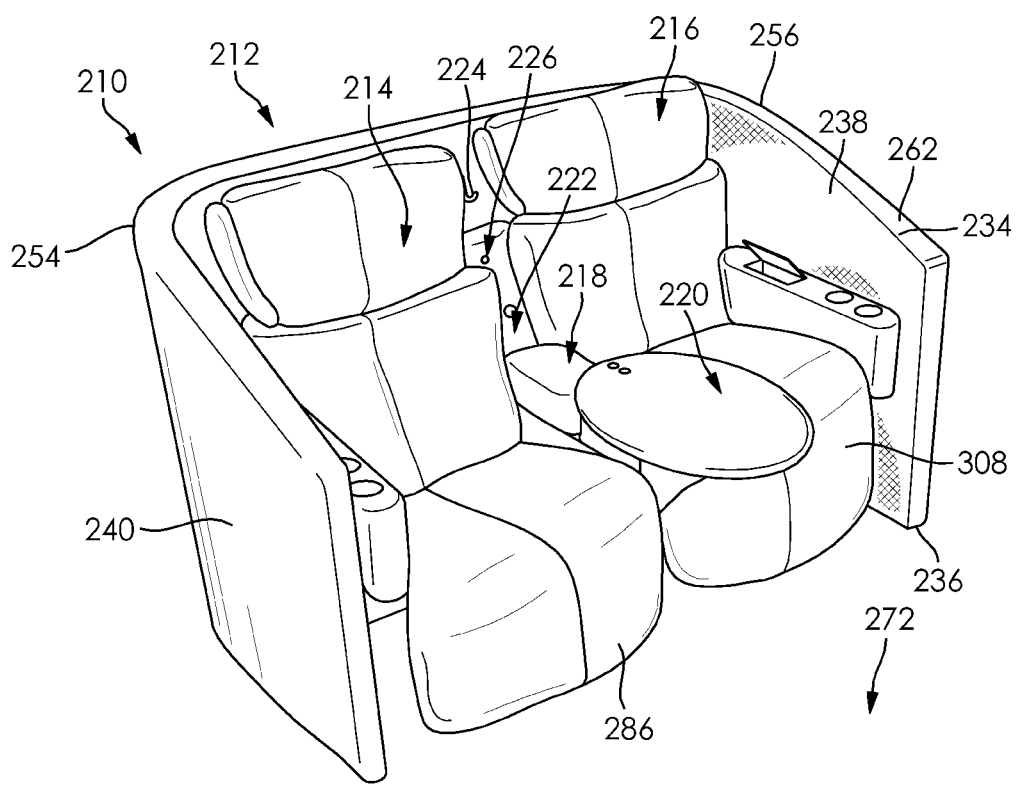
FIG. 6 is a perspective view of another example embodiment of a theater seating system. Each of the first seat and the second seat is in a first configuration and the table is in a first position.
Figure 7:
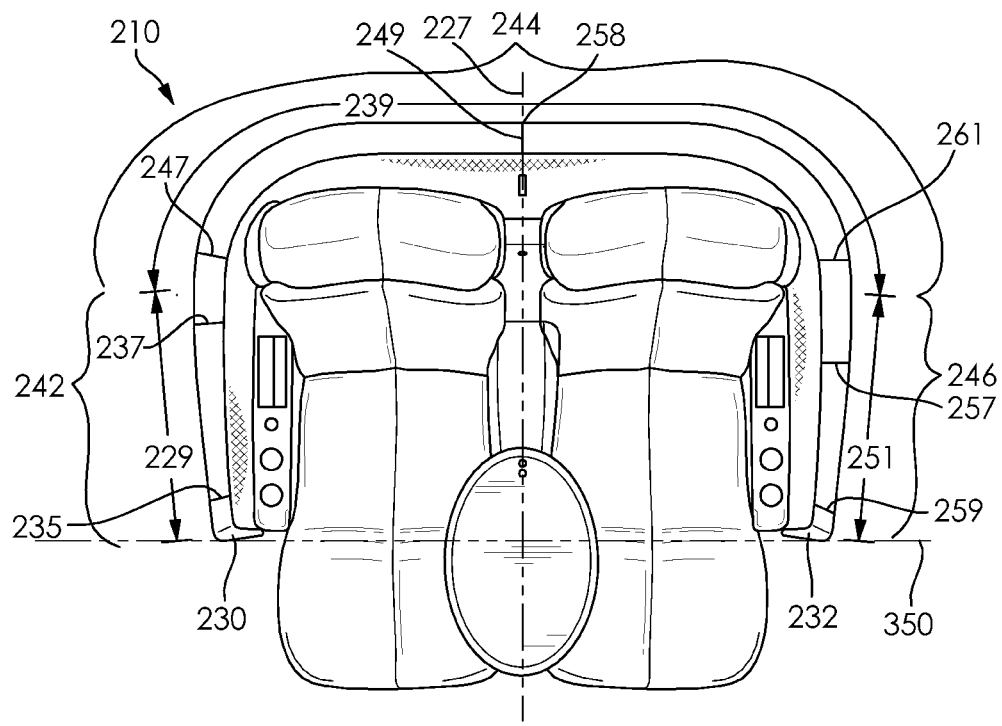
FIG. 7 is a top view of the theater seating system illustrated in FIG. 6. Each of the first seat and the second seat is in a second configuration.
Figure 8:
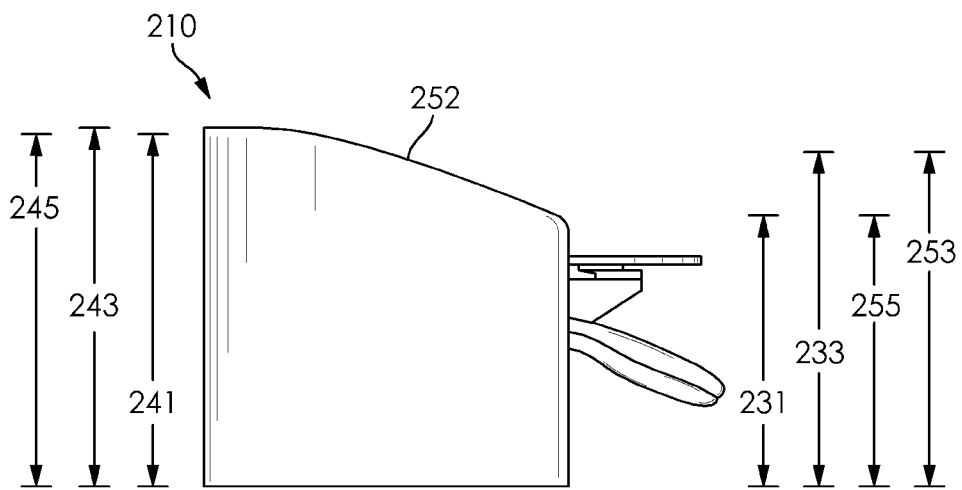
FIG. 8 is an elevation view of the theater seating system illustrated in FIG. 7.

FIGS. 6, 7, and 8 illustrate another example embodiment of a theater seating system 210 that is similar to the theater seating system 10 illustrated in FIGS. 1, 2, 3, 4, and 5 and described above, except as detailed below. In the illustrated embodiment, the theater seating system 210 comprises a separating panel 212, a first seat 214, a second seat 216, a seat divider 218, a table 220, a wall 222, a hook 224, and a light source 226.

In the illustrated embodiment, the separating panel 212 has a lengthwise axis 227, a first end 230, a second end 232, a top surface 234, a bottom surface 236, an inner surface 238, an outer surface 240, a first section 242, a second section 244, and a third section 246. In the illustrated embodiment, the first section 242, the second section 244, and the third section 246 partially wrap around each of the first seat 214, the second seat 216, the seat divider 218, the table 220, the wall 222, the hook 224, and the light source 226 such that an open section 272 is defined in front of each of the first seat 214 and the second seat 216 that is free from any obstructions, such as a section of a separating panel. For example, if desired, an audience member or a staff member could pass between the front of each of the first seat 214 and the second seat 216 and any structure disposed in front of the first seat 214 and the second seat 216.

The first section 242 extends from the first end 230 to the second section 244. The first section 242 has a length 229 that extends from the first end 230 to the second section 242, a first height 231 at the first end 230 that extends from the top surface 234 to the bottom surface 236, and a second height 233 between the first end 230 and the second section 244 that extends from the top surface 234 to the bottom surface 236. In the illustrated embodiment, the first height 231 of the first section 242 is less than the second height 233 of the first section 242 such that the first section 242 increases in height from the first end 230 toward the second section 244. As best illustrated in FIG. 8, this structural arrangement defines a predefined curve 252 along the top surface 234 of the first section 242. The first section 242 has a first thickness 235 at the first end 230 that extends from the inner surface 238 to the outer surface 240 and a second thickness 237 between the first end 230 and the second section 244 that extends from the inner surface 238 to the outer surface 240. In the illustrated embodiment, the first thickness 235 is less than the second thickness 237 such that the thickness of the first section 242 increases from the first end 230 toward the second section 244.

The second section 244 extends from the first section 242 to the third section 246. The second section 244 has a first predefined curve 254 and a second predefined curve 256. The first predefined curve 254 extends from the first section 242 and toward a first plane 258 that contains the lengthwise axis 228 of the separating panel 212. The second predefined curve 256 extends from the third section 246 and toward the first plane 258. The structural arrangement of each of the first predefined curve 254 and the second predefined curve 256 defines a rounded corner of the separating panel 212. The second section 244 has a length 239 that extends from the first section 242 to the third section 246, a first height 241 between the first section 242 and the first plane 258, a second height 243 at the first plane 258, and a third height 245 between the first plane 258 and the third section 246. Each of the first height 241, second height 243, and the third height 245 extends from the top surface 234 to the bottom surface 236. In the illustrated embodiment, the first height 241 of the second section 244 is less than the second height 243 of the second section 244 and the second height 243 of the second section 244 is greater than the third height 245 of the second section 244 such that the second section 244 increases in height from the first section 242 toward the first plane 258 and increases in height from the third section 246 toward the first plane 258. The second section 244 has a first thickness 247, a second thickness 249, and a third thickness 261. The first thickness 247 is disposed between the first section 242 and the first plane 258 and extends from the inner surface 238 to the outer surface 240. The second thickness 249 is disposed at the first plane 258 and extends from the inner surface 238 to the outer surface 240. The third thickness 261 is disposed between the first plane 258 and the third section 246 and extends from the inner surface 238 to the outer surface 240. In the illustrated embodiment, the first thickness 247 is less than the second thickness 249 and the second thickness 249 is greater than the third thickness 261 such that the thickness of the second section 244 increases from a first location between the first section 242 and the first plane 258 to the first plane 258 and decreases in thickness from the first plane 258 to a second location between the first plane 258 and the third section 246. The distance the second section 244 is disposed from the first end 230, as measured along the lengthwise axis 227, is equal to 38 inches.

The third section 246 extends from the second section 244 to the second end 232. The third section 246 has a length 251 that extends from the second section 244 to the second end 232, a first height 253 between the second section 244 and the second end 232 that extends from the top surface 234 to the bottom surface 236, and a second height 255 at the second end 232 that extends from the top surface 234 to the bottom surface 236. In the illustrated embodiment, the first height 253 of the third section 246 is less than the second height 255 of the third section 246 such that the third section 246 decreases in height from the second section 244 toward the second end 232. This structural arrangement defines a predefined curve along the top surface 234 of the third section 246. The third section 246 has a first thickness 257 between the second section 244 and the second end 232 that extends from the inner surface 238 to the outer surface 240 and a second thickness 259 at the second end 232 that extends from the inner surface 238 to the outer surface 240. In the illustrated embodiment, the first thickness 257 is greater than the second thickness 259 such that the thickness of the third section 246 decreases from a location between the second section 244 and the second end 232 toward the second end 232.

In the illustrated embodiment, the first end 230 of the separating panel 212 is disposed adjacent to the first seat 214 and the second end 232 is disposed adjacent to the second seat 216 such that no portion of the separating panel 212 is disposed in front of the first seat 214 or the second seat 216. For example, in the illustrated embodiment, the footrest 286 of the first seat 214 and the footrest 308 of the second seat 216 are directed away from the second section 244 and toward a space free of the separating panel 212. In the illustrated embodiment, the first end 230 and the second end 232 of the separating panel 212 are disposed on a second plane 350 that is disposed orthogonal to the lengthwise axis 227 of the separating panel 212. In the illustrated embodiment, the footrest 286 of the first seat 214 and the footrest 308 of the second seat 216 pass through the plane 350 when each of the first seat 214 and the second seat 216 are in the second, reclined, configuration. This structural arrangement provides a theater seating system 210 that allows for one or more audience members and/or staff members to pass in front of the theater seating system 210 and reduces the overall footprint of the theater seating system 210 relative to theater seating system 10.

Figure 9:
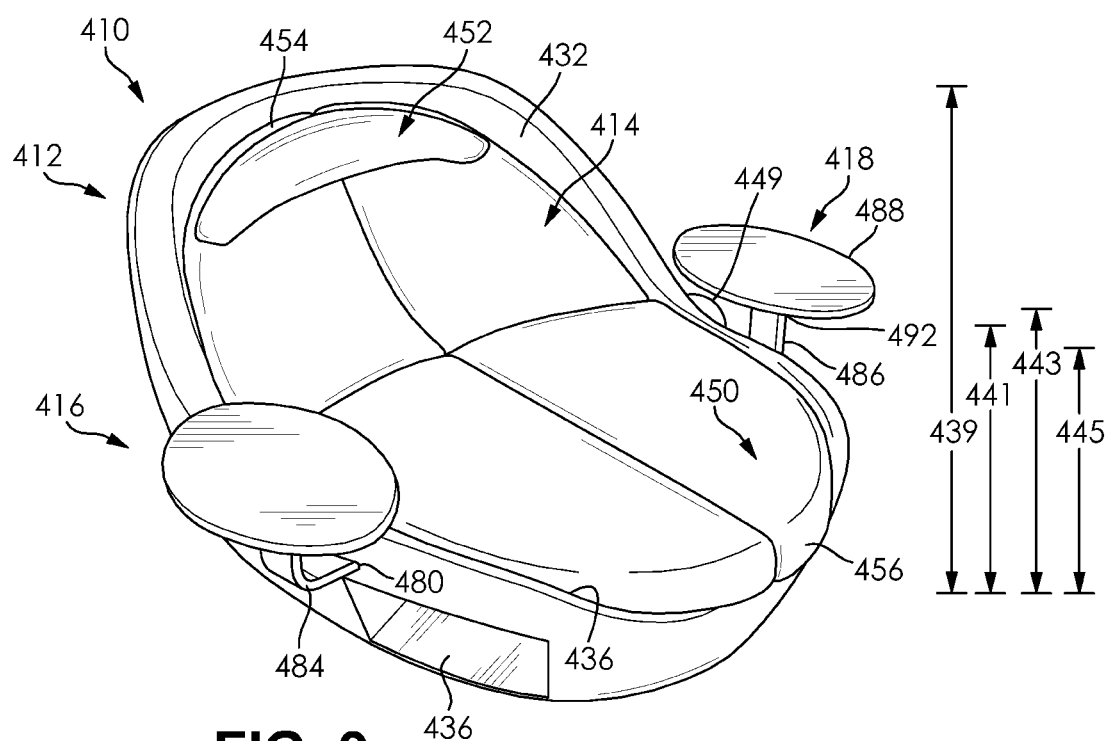
FIG. 9 is a perspective view of an example embodiment of a double theater lounge seat.
Figures 10, 11, 12:
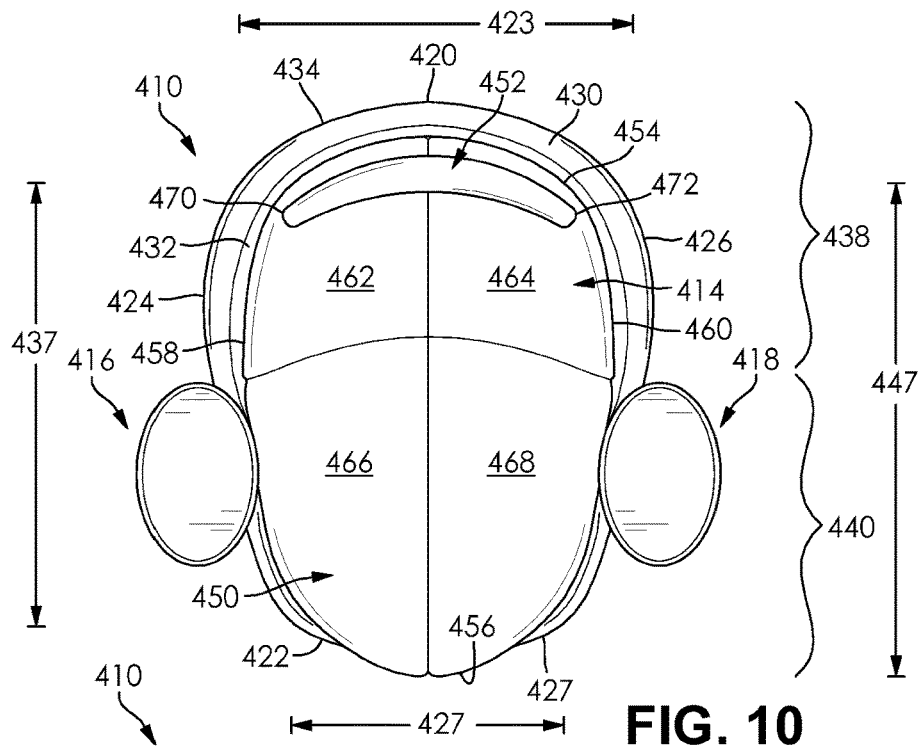
FIG. 10 is a top view of the double theater lounge seat illustrated in FIG. 9.
FIG. 11 is an elevation view of the double theater lounge seat illustrated in FIG. 9.
FIG. 12 is a perspective view of an example embodiment of a single theater lounge seat.

FIGS. 9, 10, and 11 illustrate an example embodiment of a double theater lounge seat 410. In the illustrated embodiment, the double theater lounge seat 410 comprises a base 412, a cushion 414, a first table 416, and a second table 418.

In the illustrated embodiment, the base 412 comprises a first end 420, a second end 422, a first side 424, a second side 426, a bottom 428, and a body 430 that defines a recess 432, a curved surface 434, and a storage chamber 436. The first end 424 has a first height 421 and a first length 423. The second end 422 has a second height 425 and a second length 427. The first height 421 is greater than the second height 425. In the illustrated embodiment, the first height 421 is equal to 36 inches. The first length 423 is greater than the second length 427. In the illustrated embodiment, the first length 423 is equal to 60 inches. This structural arrangement provides a body 430 that decreases in height from the first end 424 to the second end 426 and decreases in length from the first end 424 to the second end 426.

The first side 424 has a first height 429, a second height 431, a third height 433, a fourth height 435, and a length 437. The first height 429 is greater than the second height 431, the second height 431 is less than the third height 433, and the third height 433 is greater than the fourth height 435, the fourth height 435 is less than the second height 431. The second side 426 has a first height 439, a second height 441, a third height 443, a fourth height 445, and a length 447. The first height 439 is greater than the second height 441, the second height 441 is less than the third height 443, the third height 443 is greater than the fourth height 445, and the fourth height 445 is less than the second height 441. The length 437 of the first side 424 is equal to the length 447 of the second side 426. In the illustrated embodiment, each of the length 437 of the first side 424 and the length 447 of the second side 426 is greater than the first length 423 of the first end 420 and the second length 427 of the second end 422.

In the illustrated embodiment, the body 430 of the base 412 defines a curved surface 434 along the first end 420 and a curved corner between each of the first end 420 and the first side 424, the first end 420 and the second side 426, the second end 422 and the first side 424, and the second end 422 and the second side 426. While a curved surface 434 and curved corners have been illustrated, any suitable structure can be disposed between the features of a base of a theater seat. Selection of a suitable structure between the features of a base can be based on various considerations, such as the desired arrangement between one or more theater seats disposed within a theater. Example structures considered suitable to position between a first end and a first side, a first end and a second side, a second end and a first side, and/or a second end and a second side include curved, rounded, angled surfaces, right angles, and any other structural arrangement considered suitable for a particular embodiment. Example surfaces considered suitable to define on a first end, second end, first side, and/or second side of a base include curved surfaces, rounded surfaces, flat surfaces, substantially flat surfaces, and any other surface considered suitable for a particular embodiment.

The recess 432 extends into the body 430 between the first end 420 and the second end 422 and between the first side 424 and the second side 426 and toward the bottom 428 of the base 412. The recess 432 has a first portion 438 and a second portion 440. In the illustrated embodiment, the first portion 438 is disposed at an angle 449 that is less than 180 degrees relative to the second portion 440 such that the first portion 438 is inclined relative to the second portion 440. The recess 432 is sized and configured to receive a portion of the cushion 414, as described in more detail herein. In the illustrated embodiment, the storage chamber 436 extends into the body 430 from the first side 424 and toward the second side 426. The storage chamber 436 is sized and configured to house one or more items (e.g., coat, purse).

While the base 412 has been illustrated as having a particular structural arrangement, a base included in a theater seat can have any suitable structural arrangement. Selection of a suitable structural arrangement for a base can be based on various considerations, including the angle desired between the first portion and the second portion of a recess. Example structural arrangements considered suitable for a base of a theater seat include bases that omit the inclusion of a curved edge, an inclined recess, a storage chamber, and any other structural arrangement considered suitable for a particular embodiment. Example lengths considered suitable for the first end of a base include lengths equal to, less than, greater than, and about 60 inches as measured on an axis that is disposed orthogonal to the lengthwise axis of the base. Example lengths considered suitable between a first end and a second end of a base include lengths equal to, less than, greater than, and about 76 inches, as measured on the lengthwise axis of the base. Example heights considered suitable for the first end of a base include heights equal to, less than, greater than, and about 36 inches.

While a single storage chamber 436 has been illustrated on the first side 424 of the base 412, a base of a theater seat can include any suitable number of storage chambers that are positioned at any suitable location on the base. Selection of a suitable number of storage chambers to include on a base and a suitable location to position each storage chamber can be based on various considerations, including the intended use of the theater seat and the desired number of audience members intended to be seated on the theater seat. Example number of storage chambers considered suitable to define on a base include one, at least one, two, a plurality, three, four, and any other number considered suitable for a particular embodiment. Example locations considered suitable to position a storage chamber include on the first end, on the second end, on the first side, and/or on the second side of a base.

In the illustrated embodiment, the cushion 414 is sized and configured to seat a first audience member and a second audience member during a performance. However, a theater seat could alternatively seat only a first audience member, or more than two audience members. The cushion 414 has a bottom member 450 and a top member 452. The bottom member 450 has a first end 454, a second end 456, a first side 458, a second side 460, and is separated into a first section 462, a second section 464, a third section 466, and a fourth section 468. This structural configuration provides a cushion 414 that can be positioned within recess 432 and conform to the structural arrangement of the base 412. In the illustrated embodiment, the first section 462 has a first surface area, the second section 464 has a second surface area, the third section 466 has a third surface area, and the fourth section 468 has a fourth surface area. Each of the first surface area and the second surface area is less than the third surface area and the fourth surface area.

The top member 452 of the cushion 414 has a first end 470 and a second end 472. In the illustrated embodiment, the top member 452 is disposed on the first section 462 and the second section 464 of the bottom member 450 such that the first end 470 is disposed on the first section 462 and the second end 472 is disposed on the second section 464. In the illustrated embodiment, the top member 452 acts as a headrest for a first audience member and/or a second audience member that is positioned on the cushion 414 during a performance.

While the cushion 414 has been illustrated as having a particular structural arrangement, a cushion included in a theater seat can have any suitable structural arrangement. Selection of a suitable structural arrangement for a cushion can be based on various considerations, including the desired number of audience members intended to be seated on the cushion. Example structural arrangements considered suitable for a cushion of a theater seat include cushions that include only a single section, cushions that include more than one section, cushions that omit the inclusion of a top member, cushions that include a top member that is releasably attached to a bottom member, cushions that include a top member that is fixedly attached to a bottom member, and any other structural arrangement considered suitable for a particular embodiment.

The first table 416 is attached to the first side 424 and includes an arm 476 and a counter 478. The arm 476 of the first table 416 has a first end 480, a second end 482, and a predefined bend 484 between the first end 480 and the second end 482. The first end 480 is attached to the base 412 on the first side 424, extends away from the second side 426 to the bend 484, and extends from the bend 484 away from a plane that contains a portion of the bottom 428 of the base 412. In the illustrated embodiment, the counter 478 is fixedly attached to the arm 476 and is sized and configured to support one or more items (e.g., a drink or food item).

The second table 418 is attached to the second side 426 and includes an arm 486 and a counter 488. The arm 486 of the second table 418 has a first end (not shown), a second end 492, and a predefined bend (not shown) between the first end and the second end 492. In the illustrated embodiment, the second table 418 has a mirrored configuration of the first table 416. The first end is attached to the base 412 on the second side 426, extends away from the first side 424 to the bend, and extends from the bend away from a plane that contains a portion of the bottom 428 of the base 412. In the illustrated embodiment, the counter 488 is fixedly attached to the arm 486 and is sized and configured to support one or more items (e.g., a drink or food item).

While the counter 478 of the first table 416 has been illustrated as fixedly attached to the arm 476 of the first table 416 and the counter 488 of the second table 418 has been illustrated as fixedly attached to the arm 486 of the second table 418, alternative embodiments can include a counter that is movable relative to an arm. For example, a counter can be pivotably attached to the second end of an arm such that it can be moved between a first position and a second position. In the first position, the counter can be partially disposed over a cushion such that a first surface area is disposed over the cushion. In the second position, the counter can be partially disposed over the cushion such that a second surface area is disposed over the cushion. The second surface area can be greater than the first surface area, less than the first surface area, or equal to the first surface area.

While the first table 416 and second table 418 have been illustrated as having a particular structural arrangement, a table included on a theater seat can have any suitable structural arrangement. Selection of a suitable structural arrangement for a table can be based on various considerations, including the structural arrangement of the base of the theater seat on which the table is intended to be attached. Example structural arrangements considered suitable for a table of a theater seat include tables that include an arm that omits the inclusion of a predefined bend, tables that include an arm that has more than one predefined bend, and any other structural arrangement considered suitable for a particular embodiment.

Figure 21:
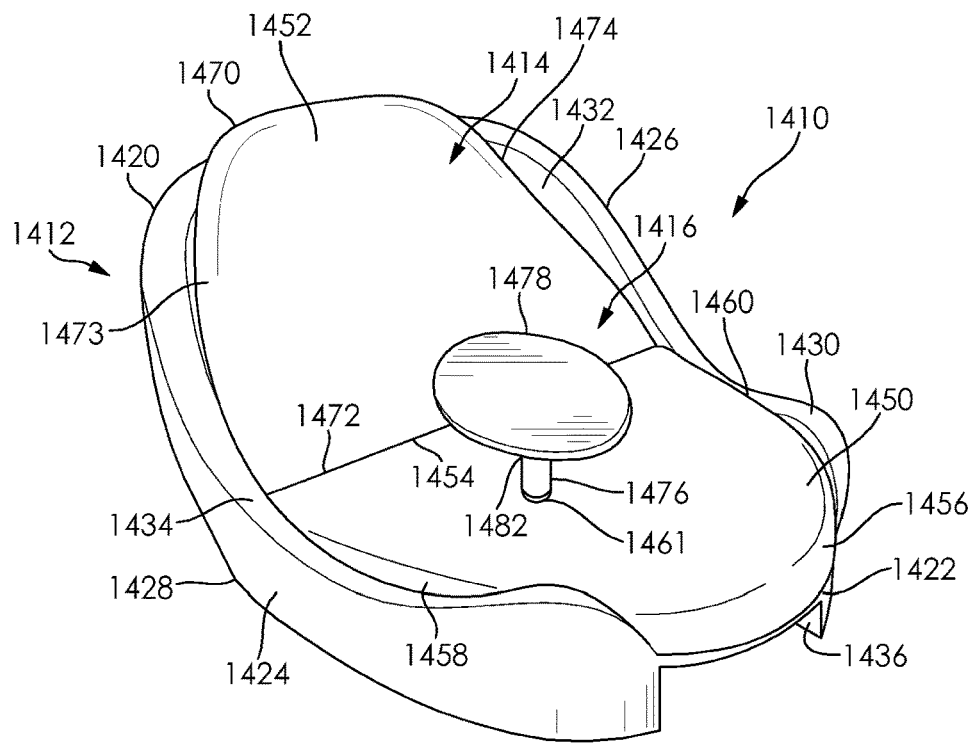
FIG. 21 is a perspective view of another example embodiment of a double theater lounge seat.

While the double theater lounge seat 410 has been illustrated as including a first table 416 and a second table 418, a theater seat can include any suitable number of tables and selection of a suitable number of tables to include on a theater seat can be based on various considerations, such as the number of audience members intended to be seated on the theater seat. Example numbers of tables considered suitable to include on a theater seat include one, at least one, two, a plurality, three, and any other number considered suitable for a particular embodiment. For example, a double theater lounge seat can include a single table disposed between the first side and the second side of a cushion such that is disposed between a first audience member and a second audience member when the first audience member and the second audience member are seated on the double theater lounge seat, as illustrated in FIG. 21.

Figure 13:
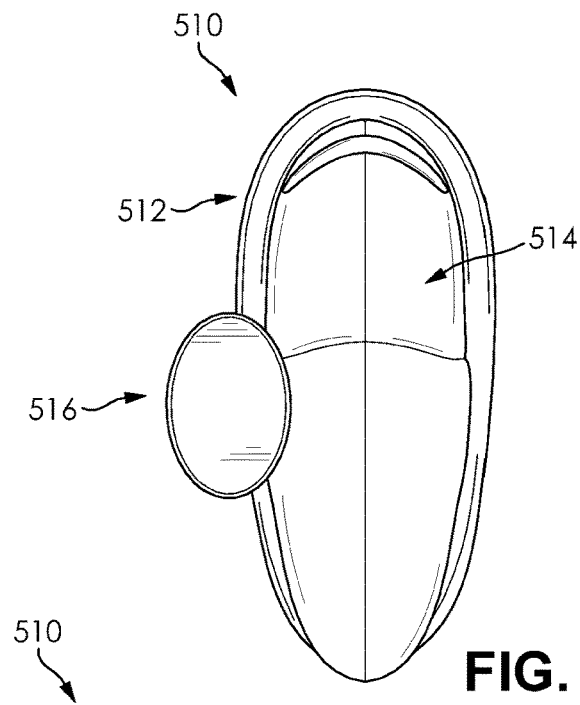
FIG. 13 is a top view of the single theater lounge seat illustrated in FIG. 12.
Figure 14:
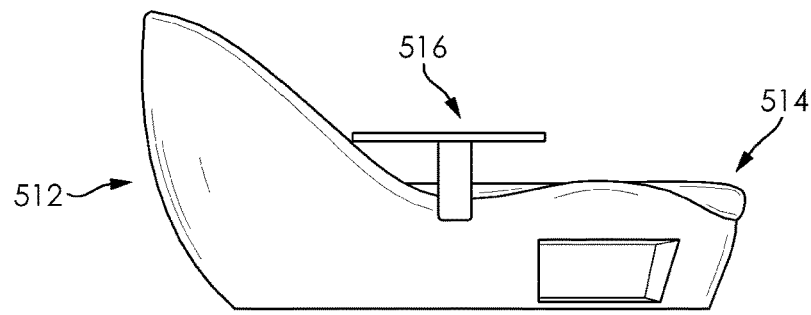
FIG. 14 is an elevation view of the single theater lounge seat illustrated in FIG. 12.

FIGS. 12, 13, and 14 illustrate an example embodiment of a single theater lounge seat 510 that is similar to the double theater lounge seat 410 illustrated in FIGS. 9, 10, and 11 and described above, except as detailed below. In the illustrated embodiment, the single theater lounge seat 510 comprises a base 512, a cushion 514, and first table 516.

In the illustrated embodiment, the base 512 is sized and configured to seat a single audience member and a portion of cushion 514 and the cushion 514 is sized and configured to seat a first audience member during a performance. The first end of the base 512 has a length equal to 32 inches as measured on an axis that is disposed orthogonal to the lengthwise axis of the base 512.

While the base 512 of the single theater lounge seat 510 has been illustrated as having a particular structural arrangement, a base included in a theater seat can have any suitable structural arrangement. Selection of a suitable structural arrangement for a base can be based on various considerations, including the desired theater seating arrangement intended to be achieved. Example structural arrangements considered suitable for a base of a theater seat include bases that omit the inclusion of a curved edge, an inclined recess, a storage chamber, and any other structural arrangement considered suitable for a particular embodiment. Example lengths considered suitable for the first end of a base include lengths equal to, less than, greater than, and about 32 inches as measured on an axis that is disposed orthogonal to the lengthwise axis of the base.

Figure 15:
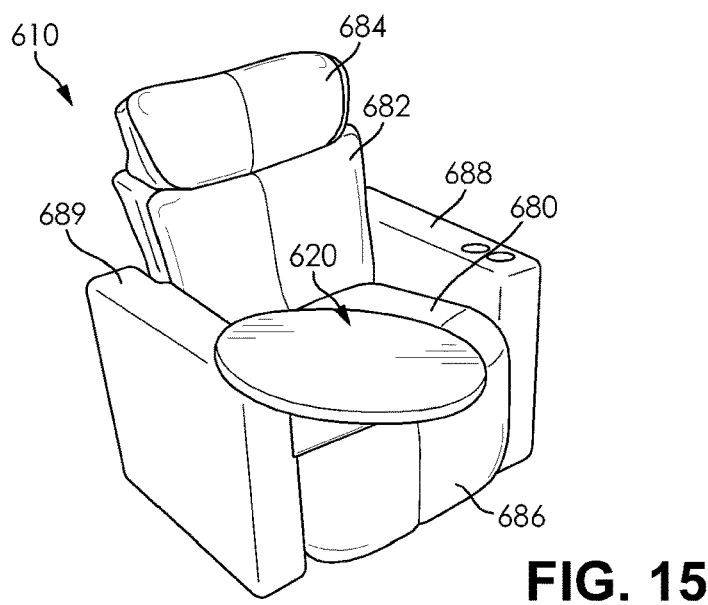
FIG. 15 is a perspective view of an example embodiment of a theater seat.

FIG. 15 illustrates an example embodiment of a theater seat 610 that is similar to the second theater seat 16 illustrated in FIGS. 1, 2, 3, 4, and 5 and described above, except as detailed below. In the illustrated embodiment, the theater seat 610 comprises a table 620, a seat pan 680, a backrest 682, a headrest 684, a footrest 686, a first armrest 688, and a second armrest 689.

In the illustrated embodiment, the second armrest 689 has a structural configuration similar to the seat divider 18 illustrated in FIGS. 1, 2, 3, 4, and 5 and described above, except that the second armrest 689 does not include a first portion (e.g., first portion 126) and a second portion (e.g., second portion 128). The table 620 is pivotably attached to the second armrest 689 and movable between a first configuration and a second configuration. In the first position, a first portion of the surface area of the table 620 is disposed over the theater seat 610 and in the second position a second portion of the surface area of the table 620 is disposed over the theater seat 610. The second surface area is greater than the first surface area.

Figure 16:
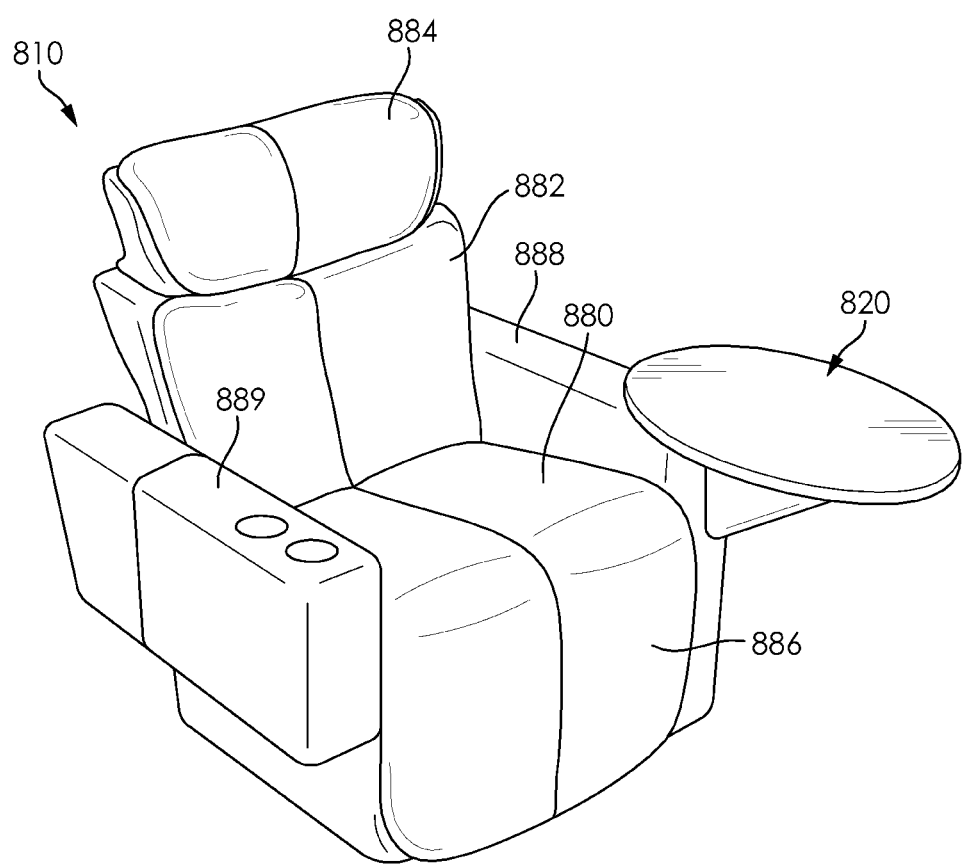
FIG. 16 is a perspective view of another example embodiment of a theater seat.

FIG. 16 illustrates another example embodiment of a theater seat 810 that is similar to the theater seat 610 illustrated in FIG. 15 and described above, except as detailed below. In the illustrated embodiments, the theater seat 810 comprises a table 820, a seat pan 880, a backrest 882, a headrest 884, a footrest 886, a first armrest 888, and a second armrest 889. In the illustrated embodiment, the theater seat 810 is compliant with the Americans With Disabilities Act and includes structure that provides releasable attachment of the theater seat 810 to the floor of a theater. This is considered advantageous at least because the theater seat 810 can be attached and detached from the floor of a theater as desired.

Any suitable structure, technique, or method of attachment can be used to accomplish releasable attachment between the theater seat 810 and the floor of a theater and selection of a suitable structure, technique, or method of attachment can be based on various considerations, such as the material(s) that form a theater seat and/or the floor of a theater. Example structures, techniques, and methods of attachment considered suitable to accomplish releasable attachment include using mechanical connectors, threaded connectors, nuts, bolts, and any other structure, technique, and/or method of attachment considered suitable for a particular embodiment.

Figure 17:
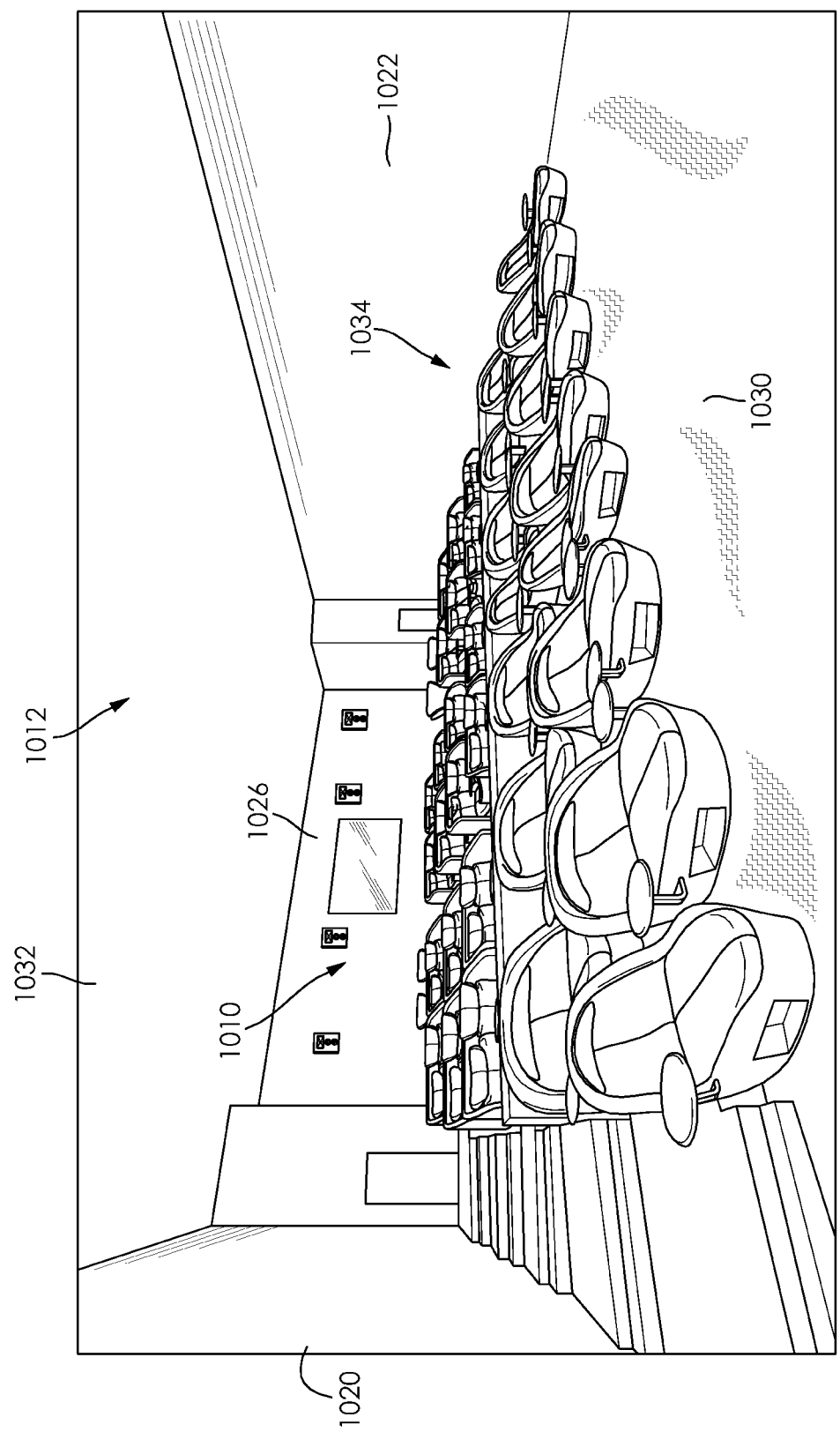
FIG. 17 is a perspective view of an example embodiment of a theater seating arrangement.
Figure 18:
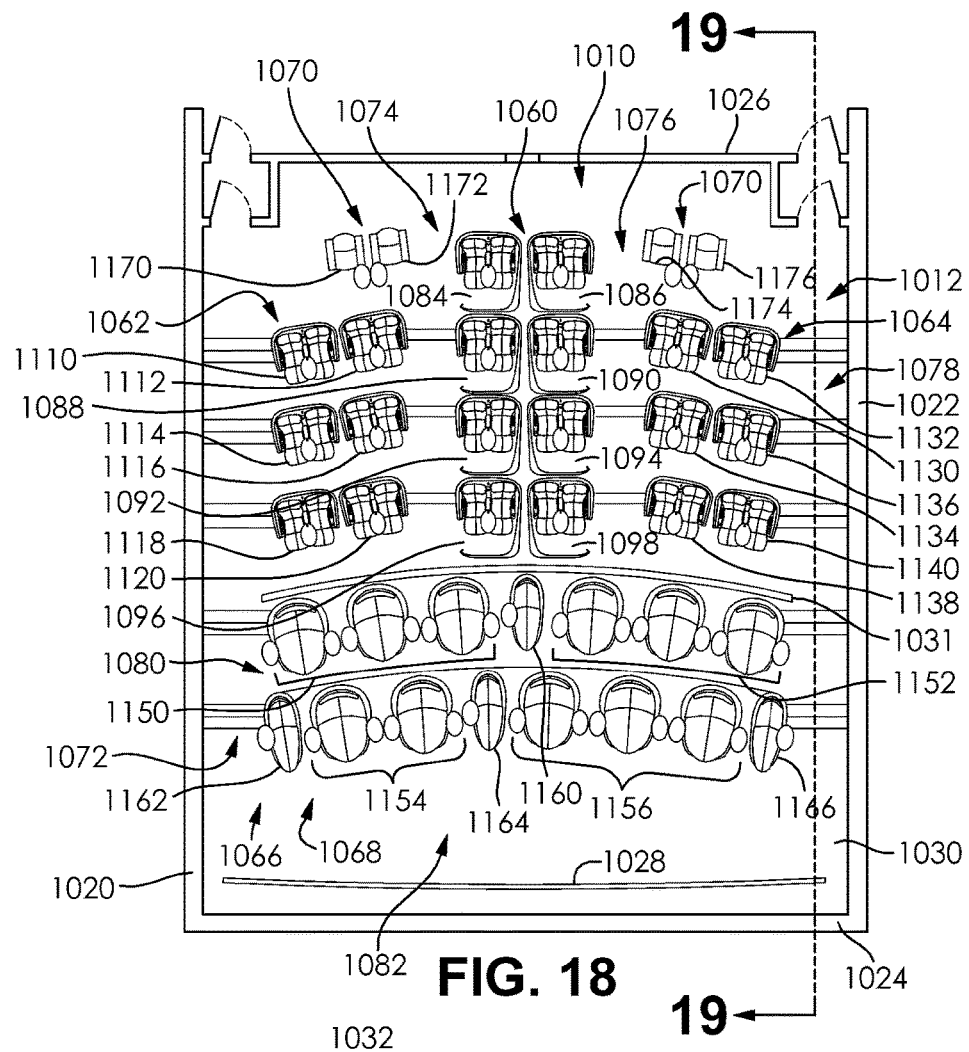
FIG. 18 is a plan view of the theater seating arrangement illustrated in FIG. 17.
Figure 19:
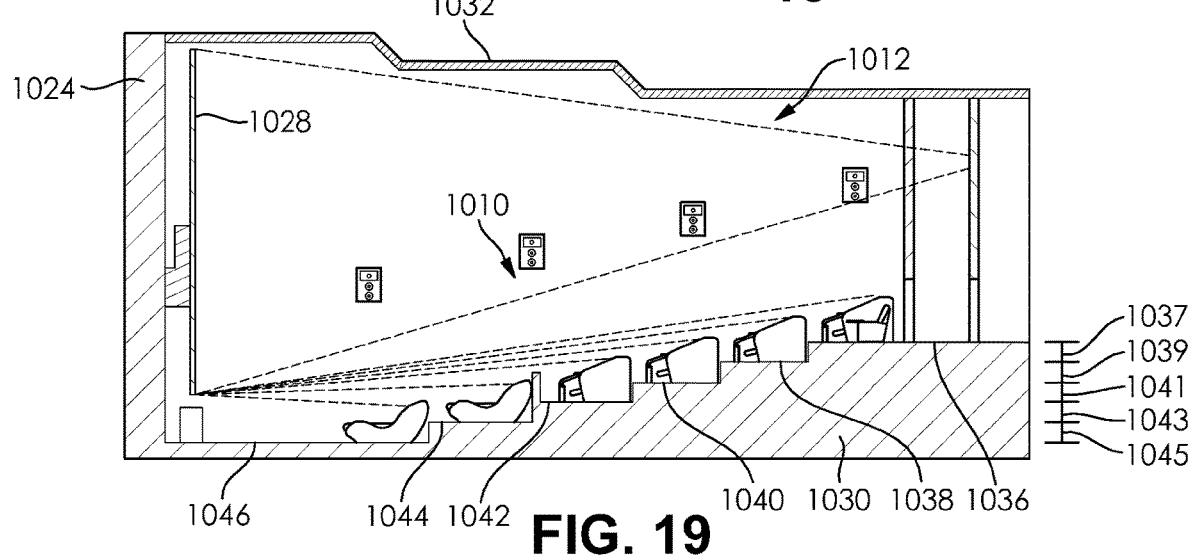
FIG. 19 is a cross-sectional view of the theater seating arrangement illustrated in FIG. 18, taken along line 19-19.

FIGS. 17, 18, and 19 illustrate an example embodiment of a theater seating arrangement 1010. In the illustrated embodiment, the theater seating arrangement 1010 comprises a theater 1012, a first plurality of theater seating systems 1060, a second plurality of theater seating systems 1062, a third plurality of theater seating systems 1064, a plurality of double theater lounge seats 1066, a plurality of single theater lounge seats 1068, a plurality of theater seats 1070, a first aisle 1072, a second aisle 1074, a third aisle 1076, a fourth aisle 1078, a fifth aisle 1080, and a forestage 1082. The first aisle 1072 is disposed between the first wall 1020 and the second plurality of theater seating systems 1062. The second aisle 1074 is disposed between the second plurality of theater seating system 1062 and the first plurality of theater seating systems 1060. The third aisle 1076 is disposed between the first plurality of theater seating systems 1060 and the third plurality of theater seating systems 1064. The fourth aisle 1078 is disposed between the second wall 1022 and the third plurality of theater seating systems 1064. The fifth aisle 1080 is disposed between the first set of double theater lounge seats 1050 and the third set of double theater lounge seats 1054, as described in more detail herein.

The theater 1012 has a first wall 1020, a second wall 1022, a third wall 1024, a fourth wall 1026, a screen 1028, a floor 1030, a partition 1031, and a ceiling 1032. The first wall 1020, the second wall 1022, the third wall 1024, the fourth wall 1026, the floor 1030, and the ceiling 1032 cooperatively define an audience area 1034. The screen 1028 is disposed on the third wall 1024 and is sized and configured to illuminate a picture projected on the screen 1028.

In the illustrated embodiment, the floor 1030 has a first elevation 1036, a second elevation 1038, a third elevation 1040, a fourth elevation 1042, a fifth elevation 1044, and a sixth elevation 1046. The first elevation 1036 is separated from the second elevation 1038 by a first distance 1037. The second elevation 1038 is separated from the third elevation 1040 by a second distance 1039. The third elevation 1040 is separated from the fourth elevation 1042 by a third distance 1041. The fourth elevation 1042 is separated from the fifth elevation 1044 by a fourth distance 1043. The fifth elevation 1044 is separated from the sixth elevation 1046 by a fifth distance 1045. In the illustrated embodiment, each of the first distance 1037, the second distance 1039, the third distance 1041, the fourth distance 1045, and the fifth distance 1047 are equal to one another. This structural arrangement provides a theater that has seating at various heights to prevent an audience member having an obstructed view during a performance.

While a particular structural arrangement has been illustrated for the theater 1012, a theater can have any suitable structural arrangement. Selection of a suitable structural arrangement for a theater can be based on various considerations, such as the desired capacity of the theater. Example structural arrangements for a theater include theaters that include more than four walls, theaters that include elevations that are separated by distances that are not equal to one another (e.g., a first distance is greater than, less than, substantially equal to, a second distance), theaters that include only one elevation that is defined at an angle relative to a wall (e.g., fourth wall), and any other structural arrangement considered suitable for a particular embodiment.

While the theater 1012 has been illustrated as having a floor 1032 that has a first elevation 1036, a second elevation 1038, a third elevation 1040, a fourth elevation 1042, a fifth elevation 1044, and a sixth elevation 1046, the floor of a theater can include any suitable number of elevations. Selection of a suitable number of elevations to include in a theater can be based on various considerations, including the desired number of audience members intended to be seated within the theater. Example numbers of elevations considered suitable to include in a theater include one, at least one, two, a plurality, three, four, five, six, seven, eight, nine, and any other number considered suitable for a particular embodiment.

While the theater 1012 has been illustrated as including a third wall 1024 and a screen 1028, a theater can include any suitable structure and/or can have any suitable configuration. Selection of a suitable structure to include in a theater and a suitable configuration for a theater can be based on various considerations, such as the intended use of the theater. Example structures considered suitable to include in a theater include a balcony, a stage, a back stage, an apron, one or more dressing rooms, and any other structure considered suitable for a particular embodiment.

In the illustrated embodiment, the first plurality of theater seating systems 1060 is disposed within the theater 1012 and comprises a first theater seating system 1084, a second theater seating system 1086, a third theater seating system 1088, a fourth theater seating system 1090, a fifth theater seating system 1092, a sixth theater seating system 1094, a seventh theater seating system 1096, and an eighth theater seating system 1098. Each of the theater seating systems 1084, 1088, 1092, and 1096 comprises a theater seating system 10 as illustrated and described herein with respect to FIGS. 1, 2, 3, 4, and 5 and has an opening that provides access to the chamber from the second aisle 1074. Each of the theater seating systems 1086, 1090, 1094, and 1098 comprises a theater seating system 10 as illustrated and described herein with respect to FIGS. 1, 2, 3, 4, and 5, except that the separating panel included in the theater seating systems 1086, 1090, 1094, and 1098 is a mirrored configuration of that illustrated and described with respect to FIGS. 1, 2, 3, 4, and 5. Each of the theater seating systems 1086, 1090, 1094, and 1098 has an opening that provides access to the chamber from the third aisle 1076.

Each of the first theater seating system 1084 and the second theater seating system 1086 is disposed on the first elevation 1036. The first theater seating system 1084 is disposed adjacent to the second theater system 1086 and the third theater seating system 1088. The third section 46 of the first theater seating system 1084 is disposed adjacent to the third section 46 of the second theater seating system 1086 and the fourth section 48 of the first theater seating system 1084 is disposed adjacent to the second section 44 of the third theater seating system 1088. The second theater seating system 1086 is disposed adjacent to the first theater system 1084 and the fourth theater seating system 1090. The third section 46 of the second theater seating system 1086 is disposed adjacent to the third section 46 of the first theater seating system 1084 and the fourth section 48 of the second theater seating system 1084 is disposed adjacent to the second section 44 of the fourth theater seating system 1088.

Each of the third theater seating system 1088 and the fourth theater seating system 1090 is disposed on the second elevation 1038. The third theater seating system 1088 is disposed between the first theater seating system 1084 and the fifth theater seating system 1092 and adjacent to the fourth theater system 1090. The second section 44 of the third theater seating system 1088 is disposed adjacent the fourth section 48 of the first theater seating system 1084, the third section 46 of the third theater seating system 1088 is disposed adjacent to the third section 46 of the fourth theater seating system 1090, and the fourth section 48 of the third theater seating system 1088 is disposed adjacent to the second section 44 of the fifth theater seating system 1092. The fourth theater seating system 1090 is disposed between the second theater seating system 1086 and the sixth theater seating system 1094 and adjacent to the third theater system 1088. The second section 44 of the fourth theater seating system 1090 is disposed adjacent the fourth section 48 of the second theater seating system 1086, the third section 46 of the fourth theater seating system 1090 is disposed adjacent to the third section 46 of the third theater seating system 1088, and the fourth section 48 of the fourth theater seating system 1090 is disposed adjacent to the second section 44 of the sixth theater seating system 1094.

Each of the fifth theater seating system 1092 and the sixth theater seating system 1094 is disposed on the third elevation 1040. The fifth theater seating system 1092 is disposed between the third theater seating system 1088 and the seventh theater seating system 1096 and adjacent to the sixth theater system 1094. The second section 44 of the fifth theater seating system 1092 is disposed adjacent the fourth section 48 of the third theater seating system 1088, the third section 46 of the fifth theater seating system 1092 is disposed adjacent to the third section 46 of the sixth theater seating system 1094, and the fourth section 48 of the fifth theater seating system 1092 is disposed adjacent to the second section 44 of the seventh theater seating system 1096. The sixth theater seating system 1088 is disposed between the fourth theater seating system 1090 and the eighth theater seating system 1098 and adjacent to the fifth theater system 1092. The second section 44 of the sixth theater seating system 1094 is disposed adjacent the fourth section 48 of the fourth theater seating system 1090, the third section 46 of the sixth theater seating system 1094 is disposed adjacent to the third section 46 of the fifth theater seating system 1092, and the fourth section 48 of the sixth theater seating system 1094 is disposed adjacent to the second section 44 of the eighth theater seating system 1098.

Each of the seventh theater seating system 1096 and the eighth theater seating system 1098 is disposed on the fourth elevation 1042. The seventh theater seating system 1096 is disposed between the fifth theater seating system 1092 and the partition 1031 and adjacent to the eighth theater system 1098. The second section 44 of the seventh theater seating system 1096 is disposed adjacent the fourth section 48 of the fifth theater seating system 1092, the third section 46 of the seventh theater seating system 1096 is disposed adjacent to the third section 46 of the eighth theater seating system 1098, and the fourth section 48 of the seventh theater seating system 1096 is disposed adjacent to the partition 1031. The eighth theater seating system 1098 is disposed between the sixth theater seating system 1094 and the partition 1031 and adjacent to the seventh theater system 1096. The second section 44 of the eighth theater seating system 1094 is disposed adjacent the fourth section 48 of the fourth theater seating system 1090, the third section 46 of the eighth theater seating system 1098 is disposed adjacent to the third section 46 of the seventh theater seating system 1096, and the fourth section 48 of the eighth theater seating system 1098 is disposed adjacent to the partition 1031.

This structural arrangement prevents an audience member and/or a staff member from passing through the chamber defined by a first theater seating system and the chamber defined by a second theater system that is disposed adjacent to the first theater seating system, which prevents obstructed views and distractions during a performance. While the third section 46 of a first theater seating system 1084 has been illustrated as disposed adjacent to the third section 46 of a second theater seating system 1086, alternative embodiments can include a theater seating system that forms a first chamber (e.g., chamber 50 of the first theater seating system 1084) and a second chamber (e.g., chamber 50 of the second theater seating system 1086). This can be accomplished, for example, by utilizing a single section between the first chamber and the second chamber such that the separating panel has seven sections, the third section being disposed between the first chamber and the second chamber.

In the illustrated embodiment, the second plurality of theater seating systems 1062 comprises a first theater seating system 1110, a second theater seating system 1112, a third theater seating system 1114, a fourth theater seating system 1116, a fifth theater seating system 1118, and a sixth theater seating system 1120. Each of the theater seating systems 1110, 1112, 1114, 1116, 1118, and 1120 comprises a theater seating system 210 as illustrated and described herein with respect to FIGS. 6, 7, and 8.

Each of the first theater seating system 1110 and the second theater seating system 1112 is disposed on the second elevation 1038. The first theater seating system 1110 is disposed adjacent to the second theater system 1112 such that the third section 246 of the first theater seating system 1110 is disposed adjacent to the first section 242 of the second theater seating system 1112. Each of the third theater seating system 1114 and the fourth theater seating system 1116 is disposed on the third elevation 1040. The third theater seating system 1114 is disposed adjacent to the fourth theater seating system 1116 such that the third section 246 of the third theater seating system 1114 is disposed adjacent to the first section 242 of the fourth theater seating system 1116. Each of the fifth theater seating system 1118 and the sixth theater seating system 1120 is disposed on the fourth elevation 1042. The fifth theater seating system 1118 is disposed adjacent to the sixth theater system 1120 such that the third section 246 of the fifth theater seating system 1118 is disposed adjacent to the first section 242 of the sixth theater seating system 1120.

In the illustrated embodiment, the third plurality of theater seating systems 1064 comprises a first theater seating system 1130, a second theater seating system 1132, a third theater seating system 1134, a fourth theater seating system 1136, a fifth theater seating system 1138, and a sixth theater seating system 1140. Each of the theater seating systems 1130, 1132, 1134, 1136, 1138, and 1140 comprises a theater seating system 210 as illustrated and described herein with respect to FIGS. 6, 7, and 8.

Each of the first theater seating system 1130 and the second theater seating system 1132 is disposed on the second elevation 1038. The first theater seating system 1130 is disposed adjacent to the second theater system 1132 such that the third section 246 of the first theater seating system 1130 is disposed adjacent to the first section 242 of the second theater seating system 1132. Each of the third theater seating system 1134 and the fourth theater seating system 1136 is disposed on the third elevation 1040. The third theater seating system 1134 is disposed adjacent to the fourth theater system 1136 such that the third section 246 of the third theater seating system 1134 is disposed adjacent to the first section 242 of the fourth theater seating system 1136. Each of the fifth theater seating system 1138 and the sixth theater seating system 1140 is disposed on the fourth elevation 1042. The fifth theater seating system 1138 is disposed adjacent to the sixth theater system 1140 such that the third section 246 of the fifth theater seating system 1138 is disposed adjacent to the first section 242 of the sixth theater seating system 1140.

In the illustrated embodiment, the plurality of double theater lounge seats 1066 comprises a first set of double theater lounge seats 1150, a second set of double theater lounge seats 1152, a third set of double theater lounge seats 1154, and a fourth set of double theater lounge seats 1156. Each double theater lounge seat of the plurality of double theater lounge seats 1066 comprises a double theater lounge seat 410 as illustrated and described herein with respect to FIGS. 9, 10, and 11. Each double theater lounge seat of the first set of double theater lounge seats 1150 and the second set of double theater lounge seats 1152 is disposed on the fifth elevation 1044. Each double theater lounge seat of the third set of double theater lounge seats 1154 and the fourth set of double theater lounge seats 1156 is disposed on the sixth elevation 1046.

In the illustrated embodiment, the plurality of single theater lounge seats 1068 comprises a first single theater lounge seat 1160, a second single theater lounge seat 1162, a third single theater lounge seat 1164, and a fourth single theater lounge seat 1166. Each single theater lounge seat of the plurality of single theater lounge seats 1068 comprises a single theater lounge seat 510 as illustrated and described herein with respect to FIGS. 12, 13, and 14. The first single theater lounge seat 1160 is disposed on the fifth elevation 1044 and between the first set of double theater lounge seats 1150 and the second set of double theater lounge seats 1152. Each of the second single theater lounge seat 1162, third single theater lounge seat 1164, and fourth single theater lounge seat 1166 is disposed on the sixth elevation 1046. The second single theater lounge seat 1162 is disposed between the first aisle 1072 and the third set of double theater lounge seats 1154. The third single theater lounge seat 1164 is disposed between the third set of double theater lounge seats 1154 and the fourth set of double theater lounge seats 1156. The fourth single theater lounge seat 1166 is disposed between the fourth aisle 1078 and the fourth set of double theater lounge seats 1156.

In the illustrated embodiment, the plurality of theater seats 1070 comprises a first theater seat 1170, a second theater seat 1172, a third theater seat 1174, and a fourth theater seat 1176. Each theater seat of the plurality of theater seats 1070 comprises a theater seat 810 as illustrated and described herein with respect to FIG. 16. Each of the first theater seat 1170, the second theater seat 1172, the third theater seat 1174, and the fourth theater seat 1176 is disposed on the first elevation 1036. The first theater seat 1170 is disposed adjacent to the second theater seat 1172. Each of the first theater seat 1170 and second theater seat 1172 is disposed on a first side of the first theater seating system 1084 and the second theater seating system 1086 such that the first theater seat 1170 is adjacent the first aisle 1072 and the second theater seat 1172 is adjacent the second aisle 1074. The third theater seat 1174 is disposed adjacent to the fourth theater seat 1176. Each of the third theater seat 1174 and fourth theater seat 1176 is disposed on a second side of the first theater seating system 1084 and the second theater seating system 1086 such that the third theater seat 1174 is adjacent the third aisle 1076 and the fourth theater seat 1176 is adjacent the fourth aisle 1078.

Figure 20:
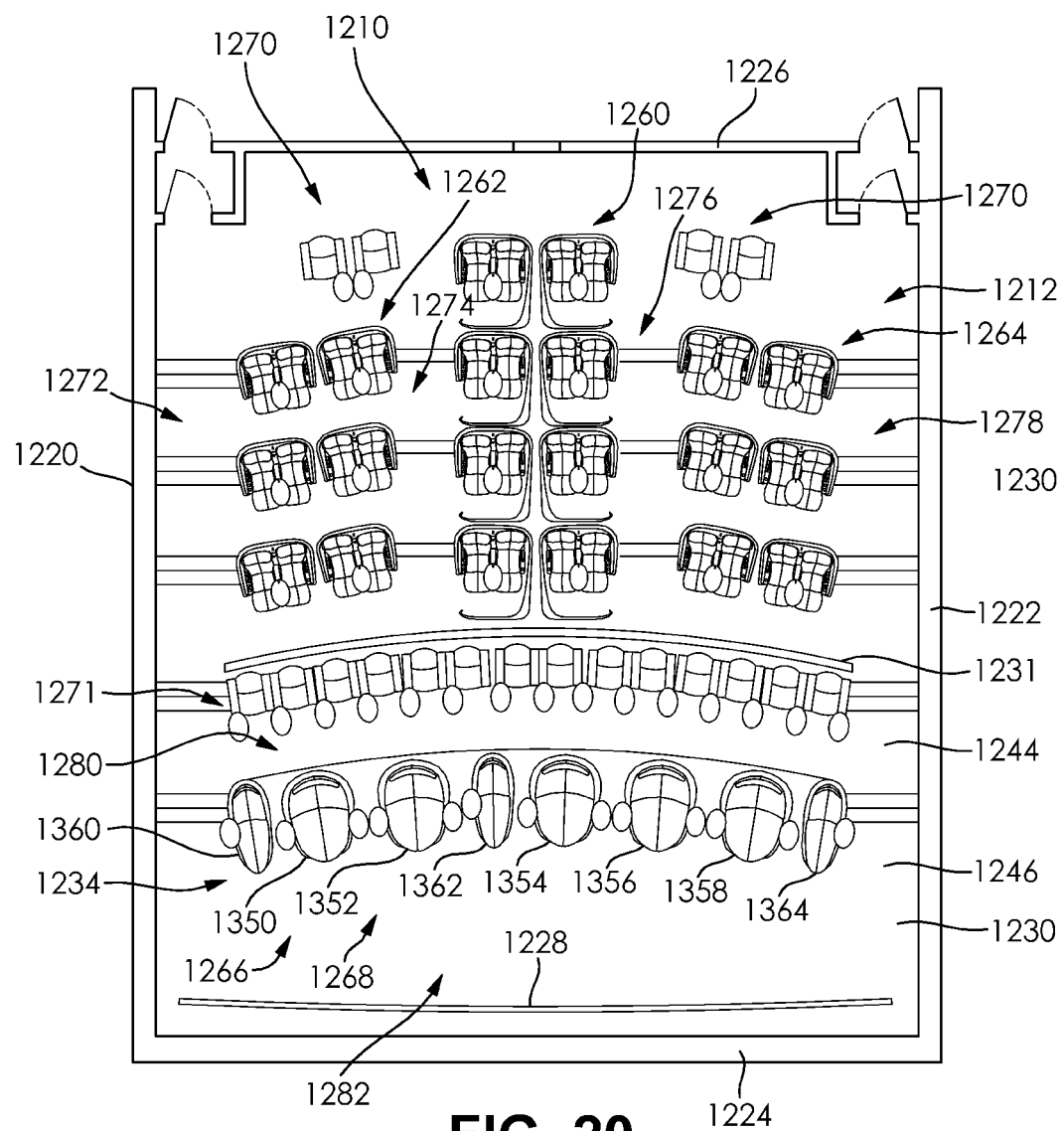
FIG. 20 is a plan view of another example embodiment of a theater seating arrangement.

FIG. 20 illustrates another example embodiment of a theater seating arrangement 1210. Theater seating arrangement 1210 is similar to the theater seating arrangement 1010 illustrated in FIGS. 17, 18, and 19 and described above, except as detailed below. In the illustrated embodiment, the theater seating arrangement 1210 comprises a theater 1212, a first plurality of theater seating systems 1260, a second plurality of theater seating systems 1262, a third plurality of theater seating systems 1264, a plurality of double theater lounge seats 1266, a plurality of single theater lounge seats 1268, a first plurality of theater seats 1270, a second plurality of theater seats 1271, a first aisle 1272, a second aisle 1274, a third aisle 1276, a fourth aisle 1278, a fifth aisle 1280, and a forestage 1282.

In the illustrated embodiment, the theater 1212 has a first wall 1220, a second wall 1222, a third wall 1224, a fourth wall 1226, a screen 1228, a floor 1230, a partition 1231, and a ceiling (not shown). The first wall 1220, the second wall 1222, the third wall 1224, the fourth wall 1226, the floor 1230, and the ceiling cooperatively define an audience area 1234. The screen 1228 is disposed on the third wall 1224 and is sized and configured to illuminate a picture projected on the screen 1228.

In the illustrated embodiment, each of the plurality of double theater lounge seats 1266 and each of the plurality of single theater lounge seats 1268 is disposed on the sixth elevation 1246. The plurality of double theater lounge seats 1266 comprises a first double theater lounge seat 1350, a second double theater lounge seat 1352, a third double theater lounge seat 1134, a fourth double theater lounge seat 1356, and a fifth double theater lounge seat 1358. Each double theater lounge seat 1350, 1352, 1354, 1356, and 1358 comprises a double theater lounge seat 410 as illustrated and described herein with respect to FIGS. 9, 10, and 11. The plurality of single theater lounge seats 1268 comprises a first single theater lounge seat 1360, a second single theater lounge seat 1362, and a third single theater lounge seat 1364. Each single theater lounge seat 1360, 1362, and 1364 comprises a single theater lounge seat 510 as illustrated and described herein with respect to FIGS. 12, 13, and 14.

In the illustrated embodiment, each of the second plurality of theater seats 1271 is disposed on the fifth elevation 1244. Each theater seat of the second plurality of theater seats 1271 comprises a theater seat 710 as illustrated and described herein with respect to FIG. 15.

The first single theater lounge seat 1360 is disposed adjacent to the first aisle 1272 and the first double theater lounge seat 1350. The second double theater lounge seat 1352 is disposed adjacent to the first double theater lounge seat 1350 and the second single theater lounge seat 1362. The third double theater lounge seat 1354 is disposed adjacent to the second single theater lounge seat 1362 and the fourth double theater lounge seat 1356. The fifth double theater lounge seat 1358 is disposed adjacent to the fourth double theater lounge seat 1356 and the third single theater lounge seat 1364. The third single theater lounge seat 1364 is disposed adjacent to the fifth double theater lounge seat 1358 and the fourth aisle 1278.

While a particular theater seating arrangement has been illustrated in FIGS. 17, 18, and 19 and in FIG. 20, any suitable theater seating arrangement can be used within a theater. Selection of a suitable theater seating arrangement can be based on various considerations such as the desired number of audience members intended to be seated with the theater and/or the number of theater seating systems intended to be positioned within the theater. Example theater seating arrangements considered suitable include arrangements that include only theater seating systems, such as those illustrated and described with respect to FIGS. 1, 2, 3, 4, and 5 and/or those illustrated and described with respect to FIGS. 6, 7, and 8, arrangements that include only double theater lounge seats, such as those illustrated and described with respect to FIGS. 9, 10, and 11 and/or those illustrated and described with respect to FIG. 21, arrangements that include only single theater lounge seats, such as those illustrated and described with respect to FIGS. 12, 13, and 14, arrangements that include only theater seats, such as those illustrated and described with respect to FIG. 15 and/or FIG. 16, arrangements that include only a combination of theater seating systems, such as those illustrated and described with respect to FIGS. 1, 2, 3, 4, and 5 and/or those illustrated and described with respect to FIGS. 6, 7, and 8, and double theater lounge seats, such as those illustrated and described with respect to FIGS. 9, 10, and 11 and/or those illustrated and described with respect to FIG. 21, arrangements that include only a combination of theater seating systems, such as those illustrated and described with respect to FIGS. 1, 2, 3, 4, and 5 and/or those illustrated and described with respect to FIGS. 6, 7, and 8, and single theater lounge seats, such as those illustrated and described with respect to FIGS. 12, 13, and 14, arrangements that include only a combination of theater seating systems, such as those illustrated and described with respect to FIGS. 1, 2, 3, 4, and 5 and/or those illustrated and described with respect to FIGS. 6, 7, and 8, and theater seats, such as those illustrated and described with respect to FIG. 15 and/or FIG. 16, arrangements that include only a combination of double theater lounge seats, such as those illustrated and described with respect to FIGS. 9, 10, and 11 and/or those illustrated and described with respect to FIG. 21, and single theater lounge seats, such as those illustrated and described with respect to FIGS. 12, 13, and 14, arrangements that include only a combination of double theater lounge seats, such as those illustrated and described with respect to FIGS. 9, 10, and 11 and/or those illustrated and described with respect to FIG. 21, and theater seats, such as those illustrated and described with respect to FIG. 15 and/or FIG. 16, arrangements that include only a combination of single theater lounge seats, such as those illustrated and described with respect to FIGS. 12, 13, and 14, and theater seats, such as those illustrated and described with respect to FIG. 15 and/or FIG. 16, arrangements that include only a combination of theater seating systems, such as those illustrated and described with respect to FIGS. 1, 2, 3, 4, and 5 and/or those illustrated and described with respect to FIGS. 6, 7, and 8, double theater lounge seats, such as those illustrated and described with respect to FIGS. 9, 10, 11 and/or those illustrated and described with respect to FIG. 21, single theater lounge seats, such as those illustrated and described with respect to FIGS. 12, 13, and 14, and theater seats, such as those illustrated and described with respect to FIG. 15 and/or FIG. 16, arrangements that include only a combination of theater seating systems, such as those illustrated and described with respect to FIGS. 1, 2, 3, 4, and 5 and/or those illustrated and described with respect to FIGS. 6, 7, and 8, double theater lounge seats, such as those illustrated and described with respect to FIGS. 9, 10, 11 and/or those illustrated and described with respect to FIG. 21, and single theater lounge seats, such as those illustrated and described with respect to FIGS. 12, 13, and 14, arrangements that include only a combination of double theater lounge seats, such as those illustrated and described with respect to FIGS. 9, 10, 11 and/or those illustrated and described with respect to FIG. 21, single theater lounge seats, such as those illustrated and described with respect to FIGS. 12, 13, and 14, and theater seats, such as those illustrated and described with respect to FIG. 15 and/or FIG. 16, arrangements that include only a combination of theater seating systems, such as those illustrated and described with respect to FIGS. 1, 2, 3, 4, and 5 and/or those illustrated and described with respect to FIGS. 6, 7, and 8, double theater lounge seats, such as those illustrated and described with respect to FIGS. 9, 10, and 11 and/or those illustrated and described with respect to FIG. 21, and theater seats, such as those illustrated and described with respect to FIG. 15 and/or FIG. 16, arrangements that include only a combination of theater seating systems, such as those illustrated and described with respect to FIGS. 1, 2, 3, 4, and 5 and/or those illustrated and described with respect to FIGS. 6, 7, and 8, single theater lounge seats, such as those illustrated and described with respect to FIGS. 12, 13, and 14, and theater seats, such as those illustrated and described with respect to FIG. 15 and/or FIG. 16, arrangements such as those described herein except the theater seating system, double theater lounge seat, single theater lounge seat, and/or theater seat is replaced with a theater seating system, such as those illustrated and described with respect to FIGS. 1, 2, 3, 4, and 5 and/or those illustrated and described with respect to FIGS. 6, 7, and 8, a double theater lounge seat, such as those illustrated and described with respect to FIGS. 9, 10, and 11 and/or those illustrated and described with respect to FIG. 21, a single theater lounge seat, such as those illustrated and described with respect to FIGS. 12, 13, and 14, or a theater seat, such as those illustrated and described with respect to FIG. 15 and/or FIG. 16, and any other combination considered suitable for a particular embodiment. For example, a theater seating arrangement can include a first theater seating system and a second theater seating system. The first theater seating system is disposed adjacent the second theater seating system such that the third section of the first theater seating system is disposed adjacent the third section of the second theater seating system and such that the opening defined by the separating panel of the first theater seating system provides access to the chamber of the first theater seating system from a first aisle and the opening defined by the separating panel of the second theater seating system provides access to the chamber of the second theater seating system from a second aisle that is different than the first aisle.

FIG. 21 illustrates another example embodiment of a double theater lounge seat 1410 that is similar to the double theater lounge seat 410 illustrated in FIGS. 9, 10, and 11 and described above, except as detailed below. In the illustrated embodiment, the double theater lounge seat 1410 comprises a base 1412, a cushion 1414, and a table 1416.

In the illustrated embodiment, the base 1412 comprises a first end 1420, a second end 1422, a first side 1424, a second side 1426, a bottom 1428, and a body 1430 that defines a recess 1432, a curved surface 1434, and a storage chamber 1436. The storage chamber 1436 extends into the body 1430 from an opening on the second end 1422 toward the first end 1420 and from an opening on the bottom 1428 toward the recess 1432. The storage chamber 1436 is sized and configured to house one or more items (e.g., coat, purse).

While a single storage chamber 1436 has been illustrated on the second end of the base 1412, a base of a theater seat can include any suitable number of storage chambers that are positioned at any suitable location on the base. Selection of a suitable number of storage chambers to include on a base and a suitable location to position each storage chamber can be based on various considerations, including the intended use of the theater seat and the desired number of audience members intended to be seated on the theater seat. Example number of storage chambers considered suitable to define on a base include one, at least one, two, a plurality, three, four, and any other number considered suitable for a particular embodiment. Example locations considered suitable to position a storage chamber include on the first end, on the second end, on the first side, on the second side of a base, and any other location considered suitable for a particular embodiment.

In the illustrated embodiment, the cushion 1414 is sized and configured to seat a first audience member and a second audience member during a performance. The cushion 1414 has a bottom member 1450 and a top member 1452. The bottom member 1450 has a first end 1454, a second end 1456, a first side 1458, second side 1460, and defines a passageway 1461. The passageway 1461 extends through the bottom member 1450 and is sized and configured to receive a portion of the arm 1476 of the table 1416, as described in more detail herein. The top member 1452 of the cushion 1414 has a first end 1470, a second end 1472, a first side 1473, and a second side 1474. The top member 1452 is disposed on the base 1412 such that it extends from beyond the first end 1420 and toward the second end 1422 to a location between the first end 1420 and the second end 1422. The bottom member 1450 is disposed on the base 1412 such that it extends from the top member 1452 (e.g., between the first end 1420 and the second end 1422 of the base 1412) to beyond the second end 1422 of the base 1412. In the illustrated embodiment, the top member 1452 acts as a headrest for a first audience member and/or a second audience member that is positioned on the cushion 1414 during a performance.

In the illustrated embodiment, the table 1416 is disposed between the first end 1420 and the second end 1422 and between the first side 1424 and the second side 1426 of the base 1412. The table 1416 includes an arm 1476 and a counter 1478. The arm 1476 of the table 1416 has a first end attached to the base 1412, and a second end 1482 attached to the counter 1478. The arm 1476 extends from the first end, through the passageway 1461 defined by the bottom member 1450 of the cushion 1414 to the second end 1482. In the illustrated embodiment, the counter 1478 is fixedly attached to the arm 1476 and is sized and configured to support one or more items (e.g., a drink or food item).

While the counter 1478 of the first table 1416 has been illustrated as fixedly attached to the arm 1476 of the table 1416, alternative embodiments can include a counter that is movable relative to an arm. For example, a counter can be pivotably attached to the second end of an arm such that it can be moved between a first position, a second position, and a third position. In the first position, the counter can be partially disposed over a first portion of a cushion such that a majority of the surface area of the counter is disposed over the cushion between the arm and the first side of the cushion. In the second position, the counter can be partially disposed over a second portion of the cushion such that a majority of the surface area of the counter is disposed over the cushion between the arm and the second side of the cushion. In the third position, the counter can be positioned between the first side and the second side of the cushion.

While the double theater lounge seat 1410 has been illustrated as including a table 1416, a theater seat can include any suitable number of tables and selection of a suitable number of tables to include on a theater seat can be based on various considerations, such as the number of audience members intended to be seated on the theater seat. Example numbers of tables considered suitable to include on a theater seat include one, at least one, two, a plurality, three, and any other number considered suitable for a particular embodiment. For example, a theater seat can include combinations, or variations, of the table configurations illustrated with respect to double theater lounge seat 410, single theater lounge seat 510, and double theater lounge seat 1410.

Figure 22:
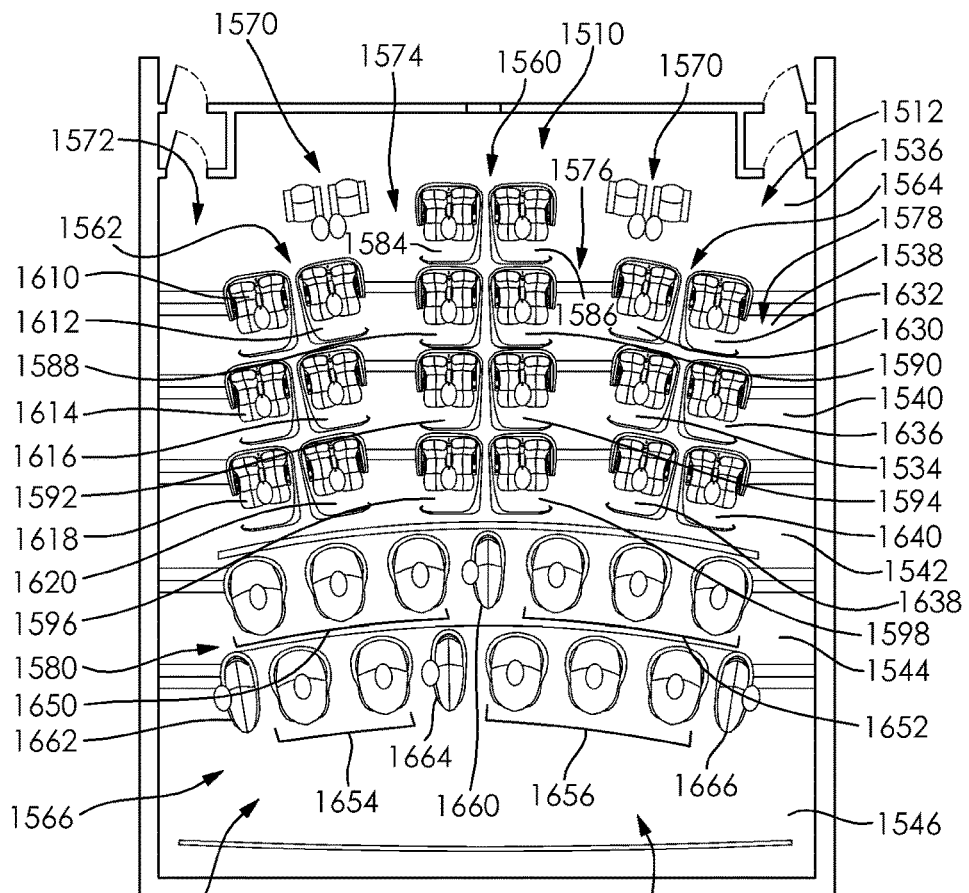
FIG. 22 is a plan view of another example embodiment of a theater seating arrangement.

FIG. 22 illustrates another example embodiment of a theater seating arrangement 1510. Theater seating arrangement 1510 is similar to the theater seating arrangement 1010 illustrated in FIGS. 17, 18, and 19 and described above, except as detailed below. In the illustrated embodiment, the theater seating arrangement 1510 comprises a theater 1512, a first plurality of theater seating systems 1560, a second plurality of theater seating systems 1562, a third plurality of theater seating systems 1564, a plurality of double theater lounge seats 1566, a plurality of single theater lounge seats 1568, a first plurality of theater seats 1570, a first aisle 1572, a second aisle 1574, a third aisle 1576, a fourth aisle 1578, a fifth aisle 1580, and a forestage 1582.

In the illustrated embodiment, the first plurality of theater seating systems 1560 is disposed within the theater 1512 and comprises a first theater seating system 1584, a second theater seating system 1586, a third theater seating system 1588, a fourth theater seating system 1590, a fifth theater seating system 1592, a sixth theater seating system 1594, a seventh theater seating system 1596, and an eighth theater seating system 1598. Each of the theater seating systems 1584, 1588, 1592, and 1596 comprises a theater seating system 10 as illustrated and described herein with respect to FIGS. 1, 2, 3, 4, and 5 and has an opening that provides access to the chamber from the second aisle 1574. Each of the theater seating systems 1586, 1590, 1594, and 1598 comprises a theater seating system 10 as illustrated and described herein with respect to FIGS. 1, 2, 3, 4, and 5, except that the separating panel included in the theater seating systems 1586, 1590, 1594, and 1598 is a mirrored configuration of that illustrated and described with respect to FIGS. 1, 2, 3, 4, and 5. Each of the theater seating systems 1586, 1590, 1594, and 1598 has an opening that provides access to the chamber from the third aisle 1576.

Each of the first theater seating system 1584 and the second theater seating system 1586 is disposed on the first elevation 1536. Each of the third theater seating system 1588 and the fourth theater seating system 1590 is disposed on the second elevation 1538. Each of the fifth theater seating system 1592 and the sixth theater seating system 1594 is disposed on the third elevation 1540. Each of the seventh theater seating system 1596 and the eighth theater seating system 1598 is disposed on the fourth elevation 1542.

In the illustrated embodiment, the second plurality of theater seating systems 1562 is disposed within the theater 1512 and comprises a first theater seating system 1610, a second theater seating system 1612, a third theater seating system 1614, a fourth theater seating system 1616, a fifth theater seating system 1618, and a sixth theater seating system 1620. Each of the theater seating systems 1610, 1614, and 1618 comprises a theater seating system 10 as illustrated and described herein with respect to FIGS. 1, 2, 3, 4, and 5 and has an opening that provides access to the chamber from the first aisle 1572. Each of the theater seating systems 1612, 1616, and 1620 comprises a theater seating system 10 as illustrated and described herein with respect to FIGS. 1, 2, 3, 4, and 5, except that the separating panel included in the theater seating systems 1612, 1616, and 1620 is a mirrored configuration of that illustrated and described with respect to FIGS. 1, 2, 3, 4, and 5. Each of the theater seating systems 1612, 1616, and 1620 has an opening that provides access to the chamber from the second aisle 1574.

Each of the first theater seating system 1610 and the second theater seating system 1612 is disposed on the second elevation 1538. Each of the third theater seating system 1614 and the fourth theater seating system 1616 is disposed on the third elevation 1540. Each of the fifth theater seating system 1618 and the sixth theater seating system 1620 is disposed on the fourth elevation 1542.

In the illustrated embodiment, the third plurality of theater seating systems 1564 is disposed within the theater 1512 and comprises a first theater seating system 1630, a second theater seating system 1632, a third theater seating system 1634, a fourth theater seating system 1636, a fifth theater seating system 1638, and a sixth theater seating system 1640. Each of the theater seating systems 1630, 1634, and 1638 comprises a theater seating system 10 as illustrated and described herein with respect to FIGS. 1, 2, 3, 4, and 5 and has an opening that provides access to the chamber from the third aisle 1576. Each of the theater seating systems 1632, 1636, and 1640 comprises a theater seating system 10 as illustrated and described herein with respect to FIGS. 1, 2, 3, 4, and 5, except that the separating panel included in the theater seating systems 1632, 1636, and 1640 is a mirrored configuration of that illustrated and described with respect to FIGS. 1, 2, 3, 4, and 5. Each of the theater seating systems 1632, 1636, and 1640 has an opening that provides access to the chamber from the fourth aisle 1578.

Each of the first theater seating system 1630 and the second theater seating system 1632 is disposed on the second elevation 1538. Each of the third theater seating system 1634 and the fourth theater seating system 1636 is disposed on the third elevation 1540. Each of the fifth theater seating system 1638 and the sixth theater seating system 1640 is disposed on the fourth elevation 1542.

This structural arrangement prevents an audience member and/or a staff member from passing through the chamber defined by a first theater seating system and the chamber defined by a second theater system that is disposed adjacent to the first theater seating system, which prevents obstructed views and distractions during a performance.

In the illustrated embodiment, the plurality of double theater lounge seats 1566 comprises a first set of double theater lounge seats 1650, a second set of double theater lounge seats 1652, a third set of double theater lounge seats 1654, and a fourth set of double theater lounge seats 1656. Each double theater lounge seat of the plurality of double theater lounge seats 1566 comprises a double theater lounge seat 1410 as illustrated and described herein with respect to FIG. 21. Each double theater lounge seat of the first set of double theater lounge seats 1650 and the second set of double theater lounge seats 1652 is disposed on the fifth elevation 1544. Each double theater lounge seat of the third set of double theater lounge seats 1654 and the fourth set of double theater lounge seats 1656 is disposed on the sixth elevation 1546.

In the illustrated embodiment, the plurality of single theater lounge seats 1568 comprises a first single theater lounge seat 1660, a second single theater lounge seat 1662, a third single theater lounge seat 1664, and a fourth single theater lounge seat 1666. Each single theater lounge seat of the plurality of single theater lounge seats 1568 comprises a single theater lounge seat 510 as illustrated and described herein with respect to FIGS. 12, 13, and 14. The first single theater lounge seat 1660 is disposed on the fifth elevation 1544 and between the first set of double theater lounge seats 1650 and the second set of double theater lounge seats 1652. Each of the second single theater lounge seat 1662, third single theater lounge seat 1664, and fourth single theater lounge seat 1666 is disposed on the sixth elevation 1546. The second single theater lounge seat 1662 is disposed between the first aisle 1572 and the third set of double theater lounge seats 1654. The third single theater lounge seat 1664 is disposed between the third set of double theater lounge seats 1654 and the fourth set of double theater lounge seats 1656. The fourth single theater lounge seat 1666 is disposed between the fourth aisle 1578 and the fourth set of double theater lounge seats 1656.

While a particular theater seating arrangement has been illustrated in FIG. 22, any suitable theater seating arrangement can be used within a theater. Selection of a suitable theater seating arrangement can be based on various considerations such as the desired number of audience members intended to be seated with the theater and/or the number of theater seating systems intended to be positioned within the theater. Example theater seating arrangements considered suitable include arrangements that include only theater seating systems, such as those illustrated and described with respect to FIGS. 1, 2, 3, 4, and 5 and/or those illustrated and described with respect to FIGS. 6, 7, and 8, arrangements that include only theater seating systems, such as those illustrated and described with respect to FIGS. 1, 2, 3, 4, and 5 and/or those illustrated and described with respect to FIGS. 6, 7, and 8, on the first elevation, second elevation, third elevation, and/or fourth elevation and only double theater lounge seats, such as those illustrated and described with respect to FIGS. 9, 10, 11 and/or those illustrated and described with respect to FIG. 21, on the fifth elevation and/or sixth elevation, arrangements that include only theater seating systems, such as those illustrated and described with respect to FIGS. 1, 2, 3, 4, and 5 and/or those illustrated and described with respect to FIGS. 6, 7, and 8, on the first elevation, second elevation, third elevation, and/or fourth elevation and only single theater lounge seats, such as those illustrated and described with respect to FIGS. 12, 13, and 14, on the fifth elevation and/or sixth elevation, arrangements that include only theater seating systems, such as those illustrated and described with respect to FIGS. 1, 2, 3, 4, and 5 and/or those illustrated and described with respect to FIGS. 6, 7, and 8, on the first elevation, second elevation, third elevation, and/or fourth elevation and only theater seats, such as those illustrated and described with respect to FIG. 15 and/or FIG. 16, on the fifth elevation and/or sixth elevation, and any other arrangement considered suitable for a particular embodiment.

FIG. 23 illustrates another example embodiment of a theater seating arrangement 1710. Theater seating arrangement 1710 is similar to the theater seating arrangement 1510 illustrated in FIG. 22 and described above, except as detailed below. In the illustrated embodiment, the theater seating arrangement 1710 comprises a theater 1712, a first plurality of theater seating systems 1760, a second plurality of theater seating systems 1762, a third plurality of theater seating systems 1764, a first aisle 1772, a second aisle 1774, a third aisle 1776, a fourth aisle 1778, and a forestage 1782. The floor 1730 of the theater 1712 has a first elevation 1736, a second elevation 1738, a third elevation 1740, a fourth elevation 1742, a fifth elevation 1744, and a sixth elevation 1746.

In the illustrated embodiment, the first plurality of theater seating systems 1760 is disposed within the theater 1712 and comprises a first theater seating system 1784, a second theater seating system 1786, a third theater seating system 1788, a fourth theater seating system 1790, a fifth theater seating system 1792, a sixth theater seating system 1794, a seventh theater seating system 1796, an eighth theater seating system 1798, a ninth theater seating system 1800, a tenth theater seating system 1802, an eleventh theater seating system 1804, and a twelfth theater seating system 1806. Each of the theater seating systems 1784, 1788, 1792, 1796, 1800, and 1804 comprises a theater seating system 10 as illustrated and described herein with respect to FIGS. 1, 2, 3, 4, and 5 and has an opening that provides access to the chamber from the second aisle 1774. Each of the theater seating systems 1786, 1790, 1794, 1798, 1802, and 1806 comprises a theater seating system 10 as illustrated and described herein with respect to FIGS. 1, 2, 3, 4, and 5, except that the separating panel included in the theater seating systems 1786, 1790, 1794, 1798, 1802, and 1806 is a mirrored configuration of that illustrated and described with respect to FIGS. 1, 2, 3, 4, and 5. Each of the theater seating systems 1786, 1790, 1794, 1798, 1802, and 1806 has an opening that provides access to the chamber from the third aisle 1776.

In the illustrated embodiment, the second plurality of theater seating systems 1762 is disposed within the theater 1712 and comprises a first theater seating system 1808, a second theater seating system 1810, a third theater seating system 1812, a fourth theater seating system 1814, a fifth theater seating system 1816, a sixth theater seating system 1818, a seventh theater seating system 1820, an eighth theater seating system 1822, a ninth theater seating system 1824, and a tenth theater seating system 1826. Each of the theater seating systems 1808, 1812, 1816, 1820, and 1824 comprises a theater seating system 10 as illustrated and described herein with respect to FIGS. 1, 2, 3, 4, and 5 and has an opening that provides access to the chamber from the first aisle 1772. Each of the theater seating systems 1810, 1814, 1818, 1822, and 1826 comprises a theater seating system 10 as illustrated and described herein with respect to FIGS. 1, 2, 3, 4, and 5, except that the separating panel included in the theater seating systems 1810, 1814, 1818, 1822, and 1826 is a mirrored configuration of that illustrated and described with respect to FIGS. 1, 2, 3, 4, and 5. Each of the theater seating systems 1810, 1814, 1818, 1822, and 1826 has an opening that provides access to the chamber from the second aisle 1774.

In the illustrated embodiment, the third plurality of theater seating systems 1764 is disposed within the theater 1712 and comprises a first theater seating system 1828, a second theater seating system 1830, a third theater seating system 1832, a fourth theater seating system 1834, a fifth theater seating system 1836, a sixth theater seating system 1838, a seventh theater seating system 1840, an eighth theater seating system 1842, a ninth theater seating system 1844, and a tenth theater seating system 1846. Each of the theater seating systems 1828, 1832, 1836, 1840, and 1844 comprises a theater seating system 10 as illustrated and described herein with respect to FIGS. 1, 2, 3, 4, and 5 and has an opening that provides access to the chamber from the third aisle 1776. Each of the theater seating systems 1830, 1834, 1838, 1842, and 1846 comprises a theater seating system 10 as illustrated and described herein with respect to FIGS. 1, 2, 3, 4, and 5, except that the separating panel included in the theater seating systems 1830, 1834, 1838, 1842, and 1846 is a mirrored configuration of that illustrated and described with respect to FIGS. 1, 2, 3, 4, and 5. Each of the theater seating systems 1830, 1834, 1838, 1842, and 1846 has an opening that provides access to the chamber from the fourth aisle 1778.

This structural arrangement prevents an audience member and/or a staff member from passing through the chamber defined by a first theater seating system and the chamber defined by a second theater system that is disposed adjacent to the first theater seating system, which prevents obstructed views and distractions during a performance.

FIGS. 24 and 25 illustrate another example embodiment of a theater seating system 1910 that is similar to the theater seating system 10 illustrated in FIGS. 1, 2, 3, 4, and 5 and described above, except as detailed below. In the illustrated embodiment, a first light source 2052, a first service call button 2054, a first light control button 2056, and a first cup holder 2058 are disposed on the first section 1942 of the separating panel 1912 and a second light source 2060, a second service call button 2062, a second light control button 2064, and a second cup holder 2066 are disposed on the third section 1946 of the separating panel 1912. Each of the first light source 2052, the first service call button 2054, the first light control button 2056, and the first cup holder 2058 is disposed on the inner surface 1938 of the separating panel 1912 and between the first end of the separating panel 1912 and the second section of the separating panel 1912 and between the bottom surface of the separating panel 1912 and the top surface 1934 of the separating panel 1912. In the illustrated embodiment, each of the first light source 2052, the first service call button 2054, the first light control button 2056, and the first cup holder 2058 is disposed between the armrest 1988 of the first seat 1914 and the top surface 1934 of the separating panel 1912.

Each of the second light source 2060, the second service call button 2062, the second light control button 2064, and the second cup holder 2066 is disposed on the inner surface 1938 of the separating panel 1912 and between the second section of the separating panel 1912 and the fourth section of the separating panel 1912 and between the bottom surface of the separating panel 1912 and the top surface 1934 of the separating panel 1912. In the illustrated embodiment, each of the second light source 2060, the second service call button 2062, the second light control button 2064, and the second cup holder 2066 is disposed between the armrest 2010 of the second seat 1916 and the top surface 1934 of the separating panel 1912.

Each of the first light source 2052 and second light source 2060 is disposed within an opening defined by the separating panel 1912 and has a first, off, state and a second, on, state. Each of the first light source 2052 and second light source 2060 is operatively connected to a power source (not shown). The first light source 2052 is operatively connected to the first light control button 2056 and the second light source 2060 is operatively connected to the second light control button 2064. The first light source 2052 is movable between the first, off, state and the second, on, state via activation of the first light control button 2056 and the second light source 2060 is movable between the first, off, state and the second, on, state via activation of the second light control button 2064. The first light source 2052 is directed toward the table included in the theater seating system 1910 and/or the first seat 1914 such that when the first light source 2052 is in the second, on, state, it illuminates the table and any structure disposed on the table. The second light source 2060 is directed toward the table included in the theater seating system 1910 and/or the second seat 1916 such that when the second light source 2060 is in the second, on, state, it illuminates the table and any structure disposed on the table.

Any suitable light source can be included in a theater seating system, and selection of a suitable light source for a first light source and/or second light source can be based on various considerations, including the desired amount of illumination intended to be directed toward a table or other structure disposed within a chamber defined by a separating panel. Example light sources considered suitable to include in a theater seating system include incandescent light bulbs, compact fluorescent light bulbs, halogen light bulbs, light emitting diodes, and any other light source considered suitable for a particular embodiment.

Each of the first service call button 1254 and the second service call button 2062 is operatively connected to a signaling device and is configured to be activated by an audience member seated in the first theater seat 1914 or second theater seat 1916. When either of the first service call button 1254 or the second service call button 2062 is activated by an audience member, the signaling device is activated to indicate to a staff member that the audience member desires attention (e.g., would like to order food or a beverage). The first light control button 2056 is configured to be activated by an audience member seated in the first theater seat 1914 and the second light control button 2064 is configured to be activated by an audience member seated in the second theater seat 1916. The first light control button 2056 is operatively connected to the first light source 2052 and is configured to activate and deactivate the first light source 2052 and the second light control button 2064 is operatively connected to the second light source 2060 and is configured to activate and deactivate the second light source 2060.

Each of the first service call button 1254 and the second service call button 2062 can comprise any suitable means and/or structure and be operatively connected to any suitable signaling device and selection of a suitable means and/or structure for a service call button and a suitable signaling device can be based on various considerations, including the distance between the service call button and the signaling device. Example means and/or structures considered suitable for a service call button and/or a signaling device include service control buttons that are wired to a signaling device, service control buttons that are wirelessly connected to a signaling device, signaling devices that illustrate a service call on a display, and any other means, structure, and/or signaling device considered suitable for a particular embodiment.

Each of the first cup holder 2058 and the second cup holder 2066 is moveable between a first position and a second position. In the first position, as shown in FIG. 24, the first cup holder 2058 is disposed within a first recess 2068 defined by the separating panel 1912 that extends from the inner surface 1938 and toward the outer surface 1940. In the second position, the first cup holder 2058 is disposed outside of the first recess 2068 such that it is configured to receive a portion of a cup (e.g., base of cup), or other structure. In the first position, the second cup holder 2066 is disposed within a second recess 2070 defined by the separating panel 1912 that extends from the inner surface 1938 and toward the outer surface 1940. In the second position, as shown in FIG. 25, the second cup holder 2066 is disposed outside of the second recess 2070 such that it is configured to receive a portion of a cup (e.g., base of cup), or other structure.

The configuration of the first light source 2052, the first service call button 2054, the first light control button 2056, the first cup holder 2058, the second light source 2060, the second service call button 2062, the second light control button 2064, and the second cup holder 2066 illustrated and described with respect to FIGS. 24 and 25 can be used in the alternative to, or in combination with, the configuration of the light source, service call button, light control button, and/or cup holders illustrated and described with respect FIGS. 1, 2, 3, 4, and 5 and illustrated and described with respect to FIGS. 6, 7, and 8. Alternative embodiments can include, or replace either a light control button or service call button with, a seat control button, as described herein. In embodiments in which the configuration illustrated and described in FIGS. 24 and 25 is included in the theater seating system 210 illustrated and described with respect to FIGS. 6, 7, and 8, each of the first light source, the first service call button, the first light control button, and the first cup holder will be disposed on the first section of the separating panel and each of the second light source, the second service call button, the second light control button, and the second cup holder will be disposed on the third section of the separating panel. The first light source, the first service call button, the first light control button, and the first cup holder will be disposed between the first end of the separating panel and the second section of the separating panel. The second light source, the second service call button, the second light control button, and the second cup holder will be disposed between the second end of the separating panel and the second section of the separating panel.

Those with ordinary skill in the art will appreciate that various modifications and alternatives for the described and illustrated embodiments can be developed in light of the overall teachings of the disclosure. Accordingly, the particular arrangements disclosed are intended to be illustrative only and not limiting as to the scope of the invention, which is to be given the full breadth of the appended claims and any and all equivalents thereof.

What is claimed is:

1. A theater seating system comprising:
a separating panel defining an open chamber, the separating panel having a separating panel lengthwise axis, a first end, a second end, a top surface, a bottom surface, a first section, a second section, and a third section, the first section extending from the first end to the second section, the second section extending from the first section to the third section, the third section extending from the second section to the second end;
the first section having a first section first height extending from the top surface to the bottom surface at the first end and a first section second height extending from the top surface to the bottom surface between the first end and the second section, the third section having a third section first height extending from the top surface to the bottom surface at the second section and a third section second height extending from the top surface to the bottom surface at the second end, the first section first height being less than the first section second height and the third section second height being less than the third section first height;
a first theater seat disposed within the open chamber; and
a second theater seat disposed within the open chamber;
wherein the first section, second section, and third section partially wrap around each of the first theater seat and the second theater seat to define an open section free of the separating panel in front of each of the first theater seat and the second theater seat.

2. The theater seating system of claim 1, further comprising a seat divider disposed between the first theater seat and the second theater seat.

3. The theater seating system of claim 2, further comprising a table disposed between the first theater seat and the second theater seat.

4. The theater seating system of claim 3, wherein the table extends beyond a plane containing the first end and the second end relative to the second section.

5. The theater seating system of claim 4, further comprising a light source disposed between the first theater seat and the second theater seat.

6. The theater seating system of claim 1, wherein the second section has a second section first end adjacent the first second, a second section second end adjacent the third section, a second section first height extending from the top surface to the bottom surface at the second section first end, a second section second height extending from the top surface to the bottom surface at a point between the second section first end and the second section second end, and a second section third height extending from the top surface to the bottom surface at the second section second end; and
wherein the second section first height is less than the second section second height.

7. The theater seating system of claim 6, wherein the second section third height is less than the second section second height.

8. The theater seating system of claim 1, wherein the first theater seat comprises a first footrest.

9. The theater seating system of claim 8, wherein the second theater seat comprises a second footrest.

10. The theater seating system of claim 1, wherein the second section defines a first predefined curve.

11. The theater seating system of claim 10, wherein the second section defines a second predefined curve.

12. The theater seating system of claim 1, wherein the separating panel has an inner surface and an outer surface;
wherein the first section has a first thickness extending from the inner surface to the outer surface;
wherein the second section has a second thickness extending from the inner surface to the outer surface;
wherein the third section has a third thickness extending from the inner surface to the outer surface; and wherein the first thickness is less than the second thickness.

13. The theater seating system of claim 12, wherein the third thickness is less than the second thickness.

14. A theater seating system comprising:
   a separating panel defining an open chamber, the separating panel having a separating panel lengthwise axis, an inner surface, an outer surface, a first end, a second end, a top surface, a bottom surface, a first section, a second section, and a third section, the first section extending from the first end to the second section, the second section extending from the first section to the third section and defining first and second predefined curves, the third section extending from the second section to the second end;
   the first section having a first thickness extending from the inner surface to the outer surface, a first section first height extending from the top surface to the bottom surface at the first end, and a first section second height extending from the top surface to the bottom surface between the first end and the second section;
   the second section having a second thickness extending from the inner surface to the outer surface;
   the third section having a third thickness extending from the inner surface to the outer surface, a third section first height extending from the top surface to the bottom surface at the second section, and a third section second height extending from the top surface to the bottom surface at the second end, the first section first height being less than the first section second height and the third section second height being less than the third section first height;
   a first theater seat disposed within the open chamber; and
   a second theater seat disposed within the open chamber;
   wherein the first and third thicknesses are less than the second thickness;
   wherein the first section, second section, and third section partially wrap around each of the first theater seat and the second theater seat to define an open section free of the separating panel in front of each of the first theater seat and the second theater seat.

15. The theater seating system of claim 14, further comprising a seat divider disposed between the first theater seat and the second theater seat.

16. The theater seating system of claim 15, further comprising a table disposed between the first theater seat and the second theater seat.

17. The theater seating system of claim 16, wherein the table extends beyond a plane containing the first end and the second end relative to the second section.

18. The theater seating system of claim 17, further comprising a light source disposed between the first theater seat and the second theater seat.

19. A theater seating arrangement comprising:
   a theater having a first wall, a second wall, a third wall, a fourth wall, a floor, and a ceiling, the first wall, the second wall, the third wall, the fourth wall, the floor, and the ceiling cooperatively defining an audience area;
   a first theater seating system disposed within the audience area and comprising:
      a first separating panel defining a first open chamber, the first separating panel having a first separating panel lengthwise axis, a first separating panel first end, a first separating panel second end, a first separating panel top surface, a first separating panel bottom surface, a first separating panel first section, a first separating panel second section, and a first separating panel third section, the first separating panel first section extending from the first separating panel first end to the first separating panel second section, the first separating panel second section extending from the first separating panel first section to the first separating panel third section, the first separating panel third section extending from the first separating panel second section to the first separating panel second end;
      the first separating panel first section having a first separating panel first section first height extending from the first separating panel top surface to the first separating panel bottom surface at the first separating panel first end and a first separating panel first section second height extending from the first separating panel top surface to the first separating panel bottom surface between the first separating panel first end and the first separating panel second section, the first separating panel third section having a first separating panel third section first height extending from the first separating panel top surface to the first separating panel bottom surface at the first separating panel second section and a first separating panel third section second height extending from the first separating panel top surface to the first separating panel bottom surface at the first separating panel second end, the first separating panel first section first height being less than the first separating panel first section second height and the first separating panel third section second height being less than the first separating panel third section first height;
      a first theater seat disposed within the first open chamber; and
      a second theater seat disposed within the first open chamber;
      wherein the first separating panel first section, first separating panel second section, and first separating panel third section partially wrap around each of the first theater seat and the second theater seat to define an first open section free of the first separating panel in front of each of the first theater seat and the second theater seat;
   a second theater seating system disposed adjacent to the first theater seating system and within the audience area, the second theater seating system comprising:
      a second separating panel defining a second open chamber, the second separating panel having a second separating panel lengthwise axis, a second separating panel first end, a second separating panel second end, a second separating panel top surface, a second separating panel bottom surface, a second separating panel first section, a second separating panel second section, and a second separating panel third section, the second separating panel first section extending from the second separating panel first end to the second separating panel second section, the second separating panel second section extending from the second separating panel first section to the second separating panel third section, the second separating panel third section extending from the second separating panel second section to the second separating panel second end;
      the second separating panel first section having a second separating panel first section first height extending from the second separating panel top surface to the second separating panel bottom surface at the second separating panel first end and a second separating panel first section second height extending from the second separating panel top surface to the second separating panel bottom surface between the second separating panel first end and the second separating panel second section, the second separating panel third section having a second separating panel third section first height extending from the second separating panel top surface to the second separating panel bottom surface at the second separating panel second section and a second separating panel third section second height extending from the second separating panel top surface to the second separating panel bottom surface at the second separating panel second end, the second separating panel first section first height being less than the second separating panel first section second height and the second separating panel third section second height being less than the second separating panel third section first height;

a third theater seat disposed within the second open chamber; and a fourth theater seat disposed within the second open chamber;

wherein the second separating panel first section, second separating panel second section, and second separating panel third section partially wrap around each of the third theater seat and the fourth theater seat to define an second open section free of the second separating panel in front of each of the third theater seat and the fourth theater seat;

a first aisle disposed between the first wall of the theater and the first theater seating system; and a second aisle disposed between the second wall of the theater and the second theater seating system.

20. The theater seating arrangement of claim 19, wherein the floor has a first elevation and a second elevation that is different from the first elevation; and wherein the first theater seating system is disposed on the first elevation; and wherein the second theater seating system is disposed on the second elevation.

* * * * *